(12) United States Patent  
Iwai et al.

(10) Patent No.: US 12,151,214 B2
(45) Date of Patent: Nov. 26, 2024

(54) SEPARATION MEMBRANE ELEMENT AND SEPARATION MEMBRANE MODULE

(71) Applicant: Toray Industries, Inc., Tokyo (JP)

(72) Inventors: Kenta Iwai, Otsu (JP); Shuji Furuno, Otsu (JP); Yoshifumi Odaka, Otsu (JP); Kenji Komori, Otsu (JP); Yasuharu Watanabe, Otsu (JP); Atsushi Kitanaka, Otsu (JP); Seiko Kantani, Otsu (JP); Hideaki Ando, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/379,435

(22) PCT Filed: Feb. 19, 2013

(86) PCT No.: PCT/JP2013/053936
§ 371 (c)(1),
(2) Date: Aug. 18, 2014

(87) PCT Pub. No.: WO2013/125506
PCT Pub. Date: Aug. 29, 2013

(65) Prior Publication Data
US 2015/0021260 A1 Jan. 22, 2015

(30) Foreign Application Priority Data

Feb. 24, 2012 (JP) .................................. 2012-039089
Jul. 10, 2012 (JP) .................................. 2012-154336
Jul. 27, 2012 (JP) .................................. 2012-167618

(51) Int. Cl.
*B01D 63/08* (2006.01)
*B01D 69/06* (2006.01)
*B01D 69/10* (2006.01)

(52) U.S. Cl.
CPC ......... *B01D 69/061* (2022.08); *B01D 63/082* (2013.01); *B01D 63/084* (2013.01);
(Continued)

(58) Field of Classification Search
CPC .. B01D 63/082; B01D 69/10; B01D 2315/06; B01D 2313/146; B01D 2321/185;
(Continued)

(56) References Cited

U.S. PATENT DOCUMENTS

2003/0150808 A1* 8/2003 Morikawa .............. B01D 65/08
210/650
2003/0226792 A1* 12/2003 Tumbrink ............. B01D 29/111
210/167.02
(Continued)

FOREIGN PATENT DOCUMENTS

JP 2-39548 4/1984
JP 63-141624 6/1988
(Continued)

OTHER PUBLICATIONS

Cornelia Vasile, Mihaela Pascu; Practical Guide to Polyethylene; 2005; Rapra Technology Limited; p. 48; https://books.google.com/books ?id=V9g2SPNV4AcC&pg=PA48&lpg=PA48&dq=%22softening+point%22+of+polyethylene&source=bl&ots=ZprpFLJv1m&sig=gvMsHp2w8wKXM_7E8w13UjxCebo&hl=en&sa=X&ved=0ahUKEwiSysrp75DKAhUByWMKHa0FCHwQ6AEIMzAD#v=onepage&q=%22softening.*

*Primary Examiner* — Patrick Orme
(74) *Attorney, Agent, or Firm* — DLA Piper LLP (US)

(57) ABSTRACT

A separation membrane element including a pair of separation membranes containing two separation membranes arranged so that the filtrate-side surfaces thereof are disposed in mutually opposed relation, and a plurality of resin members bonded to both of the mutually opposed filtrate- (Continued)

side surfaces, a peripheral edge of the pair of separation membranes being sealed.

20 Claims, 14 Drawing Sheets

(52) U.S. Cl.
CPC ...... *B01D 69/10* (2013.01); *B01D 2311/2665* (2013.01); *B01D 2313/146* (2013.01); *B01D 2315/06* (2013.01); *B01D 2319/04* (2013.01)

(58) Field of Classification Search
CPC .. B01D 2313/26; B01D 61/18; B01D 63/081; B01D 65/00; B01D 65/08; B01D 71/36; B01D 2201/087; B01D 2201/188; B01D 2311/2665; B01D 2313/02; B01D 2313/06; B01D 2313/12; B01D 2313/20; B01D 2319/04; B01D 2323/08; B01D 2323/12; B01D 2325/04; B01D 29/111; B01D 29/21; B01D 29/39; B01D 29/58; B01D 29/72; B01D 39/1623; B01D 39/2017; B01D 61/20; B01D 63/08; B01D 63/084; B01D 63/10; B01D 67/0011; B01D 67/0016; B01D 67/003; B01D 69/02; B01D 69/12; B01D 71/32; B01D 71/34; B01D 29/02; B01D 29/0036; B01D 29/0043; B01D 29/03; B01D 2201/04; B01D 2201/0415; B01D 2239/0654; B01F 2003/04177; B01F 2003/04319; B01F 3/0412; B01F 3/04269

See application file for complete search history.

(56) References Cited

U.S. PATENT DOCUMENTS

| | | | |
|---|---|---|---|
| 2004/0011723 A1* | 1/2004 | Bradford | B01D 69/00 210/493.4 |
| 2008/0210644 A1* | 9/2008 | Milunic | B01D 39/2017 210/767 |
| 2010/0096317 A1* | 4/2010 | Morita | B01D 63/081 210/321.84 |
| 2011/0000840 A1* | 1/2011 | Kiene | B01D 63/082 210/249 |
| 2012/0111784 A1* | 5/2012 | Morita | B01D 29/39 210/232 |

FOREIGN PATENT DOCUMENTS

| | | | | |
|---|---|---|---|---|
| JP | 07-031857 | | 2/1995 | |
| JP | H0731857 A | * | 2/1995 | |
| JP | 07-132214 | | 5/1995 | |
| JP | 07-194945 | | 8/1995 | |
| JP | 2000-117067 | | 4/2000 | |
| JP | 2006247453 A | * | 9/2006 | ............ B01D 63/10 |
| JP | 2011-519716 | | 7/2011 | |
| WO | 2009/004962 | | 1/2009 | |
| WO | 2011/004743 | | 1/2011 | |

\* cited by examiner

Fig. 12: Table 1

| | Internal resin member | | Filtrate-side gap (μm) | Permeability ($10^{-9}$ m³/m²/s/Pa) |
|---|---|---|---|---|
| | pattern | surface area proportion (%) | | |
| Example 1 | | 35 | 500 | 24.8 |
| Example 2 | | | 50 | 24.6 |
| Example 3 | | | 2000 | 25.8 |
| Example 4 | | | 5000 | 25.5 |
| Example 5 | dotted | 1 | 500 | 24.7 |
| Example 6 | | 5 | 2000 | 25.1 |
| Example 7 | | 20 | 2000 | 25.9 |
| Example 8 | | 67 | 2000 | 24.0 |

Fig. 13: Table 2

| | Internal resin member | | Filtrate-side gap (μm) | Permeability ($10^{-9}$ m$^3$/m$^2$/s/Pa) |
|---|---|---|---|---|
| | pattern | Surface area proportion (%) | | |
| Example 9 | striped | 31 | 2000 | 25.3 |
| Example 10 | striped | 57 | 2000 | 24.1 |
| Example 11 | checkered-steel-plate-like | 10 | 2000 | 25.0 |
| Example 12 | checkered-steel-plate-like | 34 | 2000 | 24.8 |
| Example 13 | checkered-steel-plate-like | 59 | 2000 | 24.2 |

Fig. 14: Table 3

| | Internal resin members | | Filtrate-side gap (μm) | Permeability ($10^{-9}$ m$^3$/m$^2$/Pa) |
|---|---|---|---|---|
| | pattern | surface area proportion (%) | | |
| Example 14 | grid | 34 | 2000 | 24.5 |
| Comparative example 1 | none | 0 | 400 or less | 6.3 |
| Comparative example 2 | none (flow channel net embedded) | - | net | 16.2 |
| Example 15 | dotted | 35 | 30 | 18.6 |
| Example 16 | dotted | 77 | 2000 | 17.6 |

SEPARATION MEMBRANE ELEMENT AND SEPARATION MEMBRANE MODULE

This application claims priority to PCT/JP2013/053936 filed Feb. 19, 2013, which claims priority to JP 2012-039089 filed Feb. 24, 2012, JP 2012-154336 filed Jul. 10, 2012, and JP 2012-167618 filed Jul. 27, 2012, the subject matter of which is incorporated herein by reference.

TECHNICAL FIELD

This disclosure relates to a separation membrane element and separation membrane module that can serve effectively in the fields of water processing, including drinking water production, water purification, and waste water treatment, as well as food manufacture industry.

BACKGROUND

Separation membranes such as flat membranes and hollow fiber membranes that have come into use for purification of sewage and waste water in recent years are generally utilized in the form of a separation membrane element that contains such separation membranes or a separation membrane module that contains a plurality of such elements to carry out water purification. There are various types of separation membrane that have been used for separation processes that contain separation membrane elements. They include microfiltration membranes, ultrafiltration membranes, nanofiltration membranes, reverse osmosis membranes, and forward osmosis membranes, which have different pore sizes and separation functions, have been serving for various purposes depending on target components to be separated and required separation performance, including, for instance, production of drinking water from sea water, brackish water, or hazardous material-containing water, production of industrial ultrapure water, treatment of drainage water, and recovery of valuable resources.

The membrane separation activated sludge process (membrane bioreactor process, MBR) employs separation membranes immersed in an activated sludge tank so that the activated sludge and the treated water are separated by the separation membranes. Being able to produce high quality water though small in size, MBRs have been adopted mainly in small scale facilities in Japan, while in overseas countries, they are actively introduced in large scale facilities, mostly newly built ones, with capacities of more than 100,000 m³/day.

Japanese Unexamined Patent Publication (Kokai) No. HEI-7-132214 discloses membrane elements arranged at appropriate intervals in a casing and immersed in treatment water. The membrane element has a membrane support plate, and a surface of each membrane support plate is covered with a membrane filter (separation membrane), and an aperture is produced in the surface of the membrane support plate to provide a filtered liquid flow channel that connects to a filtered liquid aspiration tube. The separation membrane element described in Japanese Unexamined Patent Publication (Kokai) No. HEI-7-132214 contains many flat membrane type elements composed mainly of membrane support plates and separation membranes attached to the plates, and the membrane support plates have grooves designed to collect filtered water. However, the membrane support plate has the problem of being thick and heavy.

To provide a flat membrane element free of membrane support plates and a production method therefor, Japanese Unexamined Patent Publication (Kokai) No. 2000-117067 proposes a bag-like flat membrane element consisting of two flat membranes whose edges are sealed with a resin adhesive.

In addition, Japanese Unexamined Patent Publication No. 2011-519716 describes a composite filter including a first filter membrane, first adhesiveness net formed of a thermoplastic polymer, effluent fabric, second adhesiveness net formed of a thermoplastic polymer, and a second filter membrane. The first and second filter membranes are bonded to the effluent fabric by the first and second adhesiveness nets.

In the case of a separation membrane element including a support plate having a separation membrane bonded to each surface thereof as described in Japanese Unexamined Patent Publication (Kokai) No. HEI-7-132214, the support plate used is commonly formed of resin such as ABS. In the membrane separation activated sludge process, aeration is performed from the bottom of each membrane element immersed in water to be treated (hereinafter treatment water) so that the membrane surface is always washed, thereby allowing treated water to be obtained from activated sludge with a high solid content. In this use environment, the energy caused by aeration is received by the membrane element and, therefore, the membrane element is required to have a high rigidity to resist the energy of aeration. Accordingly, depending on the size of the membrane element, the support plate is required to have a thickness of at least about 4 mm or more, leading to cost increases for the membrane element and membrane module. Furthermore, because of the thickness of the support plate, a membrane module composed of a plurality of membrane elements arranged in parallel has the disadvantage that the membrane area per unit installation area (filling rate of separation membrane) is small.

In Japanese Unexamined Patent Publication (Kokai) No. 2000-117067, the filtrate-side surfaces of the separation membranes facing each other come in contact during filtration to cause a large flow resistance, leading to a failure in obtaining a sufficient filtrate flow rate. There is also the disadvantage that the membrane element does not have enough strength to sufficiently resist the aeration energy during the operation of the membrane separation activated sludge process.

For the technique in Japanese Unexamined Patent Publication No. 2011-519716, furthermore, there are the disadvantages that a large flow resistance is caused when the filtrate passes through the effluent fabric, preventing a sufficiently high filtrate flow rate from being achieved and also that the technique requires many members such as adhesiveness net and discharging components, in addition to the membrane as well as a complicated production process, failing to reduce the cost for the membrane element sufficiently in spite of the structure free of support plates.

Since the membrane element suffers the energy of aeration in the use environment of the MBR process, the membrane element and membrane module are required to have both moderate rigidity and flexibility to evade the energy of aeration while the cost of the membrane module should be minimized, but actually, such a membrane element and membrane module have not been realized.

It could therefore be helpful to provide a technique to improve the filtrate flow rate.

Our separation membrane elements and separation membrane modules are configured as described below:

(1) A separation membrane element comprising a pair of separation membranes containing two separation membranes arranged so that the filtrate-side surfaces thereof are disposed in mutually opposed relation, and a plurality of resin members bonded to both of the mutually opposed filtrate-side surfaces, the peripheral edge of the pair of separation membranes being sealed.

(2) A separation membrane element as described in (1), wherein the surface area of the resin members accounts for 1% or more and 70% or less of the surface area of the separation membranes inside the peripheral edge.

(3) A separation membrane element as described in either (1) or (2), wherein the separation membranes constituting the pair of separation membranes are disposed with a gap of 50 μm or more and 5,000 μm or less maintained therebetween.

(4) A separation membrane element as described in any one of (1) to (3), wherein the resin members are formed of thermoplastic polymer having a softening point of 80 to 200° C.

(5) A separation membrane element as described in any one of (1) to (4), wherein the resin members are disposed in a dotted, linear, or grid-like arrangement.

(6) A separation membrane element as described in any one of (1) to (5), wherein the resin members are disposed in a linear arrangement, the linearly arranged portions forming a checkered-steel-plate-like checkered pattern.

(7) A separation membrane element as described in (6), wherein the checks in the checkered pattern of resin members are disposed in nearly parallel or nearly perpendicular directions to the peripheral edge of the pair of separation membranes.

(8) A separation membrane element as described in any one of (1) to (7), wherein a water collecting member is provided in a part of the peripheral edge so that a collected water flow channel disposed inside the peripheral edge runs out of the element through the water collecting member.

(9) A separation membrane module comprising a plurality of separation membrane elements as described in any one of (1) to (8) disposed in parallel to each other and arranged so that the water collecting members of adjacent separation membrane elements are not located at the same position.

We form a highly efficient, stable filtrate-side flow channel and increase the effective membrane area per unit volume, making it possible to produce a high-efficiency, high-performance, high-durability separation membrane having high permeability and high durability.

BRIEF DESCRIPTION OF THE DRAWINGS

FIG. 1 (*a*) is a cross section including the through-thickness center of the separation membrane element and parallel to the membrane surface, while FIG. 1 (*b*) is a cross section parallel to the thickness direction of the separation membrane element.

FIG. 9 (*a*) is a plan view while FIG. 9 (*b*) is a front view.

FIG. 12 depicts Table 1, listing measurements of the surface area proportion of resin members, gap between filtrate-side surfaces, and water permeability.

FIG. 13 depicts Table 2, listing measurements of the surface area proportion of resin members, gap between filtrate-side surfaces, and water permeability.

FIG. 14 depicts Table 3, listing measurements of the surface area proportion of resin members, gap between filtrate-side surfaces, and water permeability.

EXPLANATION OF NUMERALS 1. separation membrane element
2. separation membrane
3. separation function layer
4. base
5. gap
6. sealing member
7. internal resin member
8. water collecting member
9. water collecting port
11. inclined side
12. separation membrane module
13. separation membrane element
14. separation membrane immersion water tank
15. air diffusing apparatus
16. blower
17. aspiration pump
18. treatment water inlet
19. treatment water outlet
20. filtrate
23. fixing jig
24. water collecting pipe DETAILED DESCRIPTION FIGS. 1 (*a*) and (*b*) show cross sections illustrating an example of our separation membrane element. FIG. 1 (*a*) is a cross-sectional plan view, while FIG. 1 (*b*) schematically illustrates a cross section parallel to the thickness direction. Similarly, FIGS. 2 and 3, FIG. 4 (*a*), and FIGS. 5 to 7 give cross-sectional plan view of another embodiment of the separation membrane element, and FIG. 4 (*b*) gives a cross section parallel to the thickness direction of another example of the separation membrane element.

In FIGS. 1 (*a*) and (*b*) to FIG. 7, the numeral 1 represents a separation membrane element; the numeral 2 represents a separation membrane; the numeral 3 represents a separation function layer; the numeral 4 represents a base; the numeral 5 represents a gap between separation membranes; the numeral 6 represents a sealing member formed of a peripheral resin layer; the numeral 7 represents internal resin members; the numeral 8 represents a water collecting member; and the numeral 9 represents a water collecting port.

Figure 1:
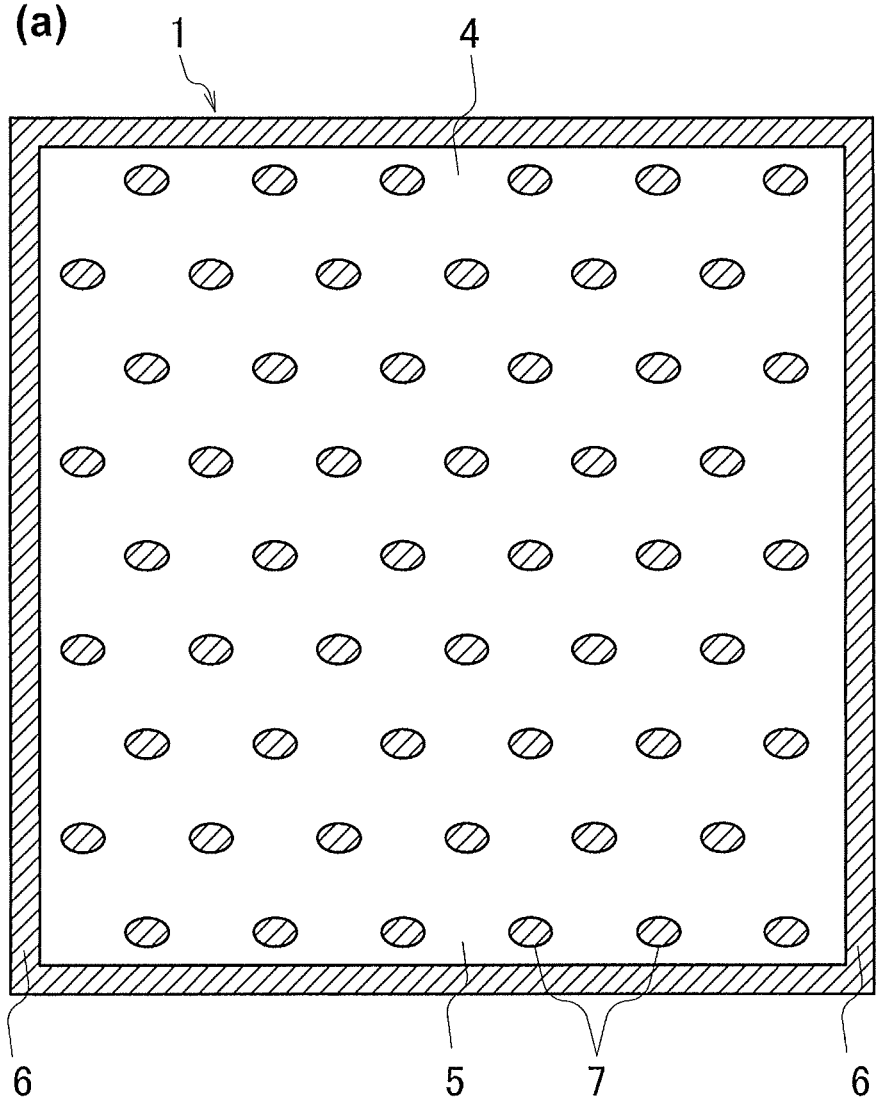
FIGS. 1 (*a*) and (*b*) show cross sections schematically illustrating an example of our separation membrane element.
Figure 1:
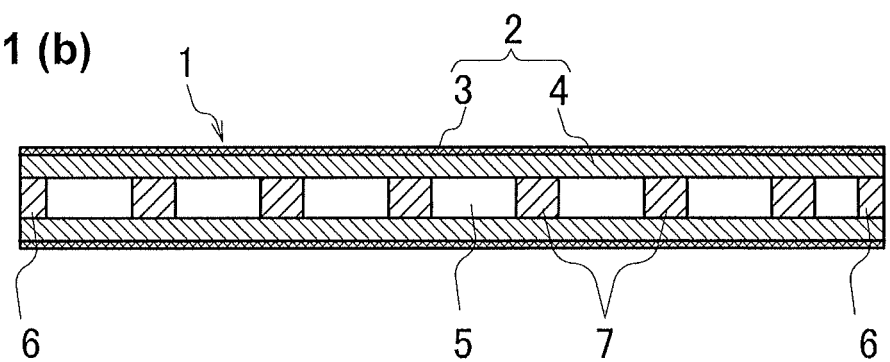

The separation membrane element 1 includes two separation membranes 2 and 2, and the separation membranes 2 and 2 are arranged so that their filtrate-side surfaces are mutually opposed with a predetermined gap 5 maintained therebetween. The separation membrane element is hereinafter occasionally referred to simply as element. The periphery of the gap 5 is sealed with resin to form a sealing member 6. Some portions of the separation membranes 2 and 2 located inside the peripheral sealing member 6 are connected by two or more internal resin members 7.

Specifically, the two separation membranes 2 and 2 are bonded via the resin members 7 designed to connect the separation membranes 2 and 2 while maintaining a predetermined gap. The predetermined gap 5 formed between the separation membranes 2 and 2 provides a flow channel where the filtrate from the membranes passes through, which is referred to as collected water flow channel, and the water passing through the channel is collected in a water collecting member 8 (shown in FIGS. 2 to 7) and sent outside therethrough. The periphery (peripheral edge) of the separation membrane element is sealed with an appropriate method such as the use of an adhesive resin, heat welding, and ultrasonic welding to form the sealing member 6. A water collecting member 8 is provided at a portion of the peripheral sealing member 6, and the water collecting member 8 is left unsealed.

In the arrangement of the separation membranes with mutually opposed filtrate-side surfaces, the filtrate-side surfaces of the two separation membranes are disposed so that they face each other. Such two separation membranes facing each other are referred to herein as a pair of separation membranes. Note that such a pair of separation membranes may be formed by either two separable separation membranes or one folded separation membrane. A gap is maintained between the filtrate-side surfaces of the separation membranes.

The sealing member 6 is disposed along the periphery of the separation membranes to surround the gap 5. The sealing member 6 is bonded to both of the two mutually opposed filtrate-side surfaces in the pair of separation membrane to seal the gap between the separation membranes in the pair of separation membranes. Thus, a bag-like membrane unit is formed. The term "sealing" refers to a process, such as adhesion, pressure-bonding, welding, fusion bonding, and folding, intended to prevent the supplied water from flowing directly into the interior of the bag-like membrane unit (i.e., prevent the supplied water from entering without passing through a separation membrane). The process also prevents the filtrate coming after passing through the separation membrane from leaking out of the separation membrane element except through the water collecting member 8.

In the structure in which "two separation membranes are connected" via a resin member 7, one resin member 7 is bonded to both the filtrate-side surface of a separation membrane 2 in a separation membrane pair and the filtrate-side surface of the other separation membrane 2 that faces the former. Specifically, in the separation membrane pair, one separation membrane is fixed to the other separation membrane via a resin member.

The term "internal" refers to the filtrate-side surfaces of the separation membranes excluding the periphery. In particular, in the case of a bag-like membrane unit formed of separation membranes as described above, the term "internal" refers to the part surrounded by the sealing member.

FIG. 1 shows a configuration in which a separation membrane 2 is composed of a base 4 and a separation function layer 3 formed thereon, and one of the surfaces of the base 4 that is opposite the one in contact with the separation function layer 3 is defined as the filtrate-side surface of the separation membrane 2. Note that this disclosure is not limited to the structures formed of the separation membranes 2 illustrated in the diagrams. There are no specific limitations on the separation membrane as long as required components in a fluid supplied to the surface of the separation membrane is separated out to provide a filtrate fluid that has passed through the separation membrane. The separation membrane may be composed, for instance, of a separation function layer, porous support layer, and base.

As illustrated in FIG. 1 (*b*), at least two resin members 7 are bonded to both of the two mutually opposed filtrate-side surfaces and, accordingly, the pressure caused by the counterpressure washing described above is dispersed over the bonding portions (resin members 7) located inside instead of concentrating on the sealing member 6. This depresses the occurrence of peeling between the separation membranes, thereby preventing water leakage from the supply side to the filtrate side. Each resin member 7 can have a relatively high rigidity and accordingly, the degree of freedom of structural features such as the number of the resin members 7 per unit area of the separation membrane and the surface area of each resin member 7 is relatively high.

The base of the separation membrane may be impregnated with the resin component of the resin members 7. If a resin is located on the base of the filtrate side of the separation membrane and the surface of the separation function layer of the separation membrane is heated, impregnation with the resin proceeds from the filtrate side toward the function layer in the separation membrane. As the impregnation proceeds as above, the adhesion between the resin and the base becomes stronger. Consequently, during washing of an element produced, peeling between the pair of separation membranes will not be easily caused if the filtrate-side surfaces are washed with chemicals.

In the element, the flow resistance on the filtrate coming through the separation membranes can be reduced by maintaining a predetermined gap 5 on the filtrate side of the separation membranes. Commonly, if a member such as spacer is not provided on the filtrate side of the separation membranes in an element, the filtrate-side surfaces of the separation membranes will come in close contact with each other to increase the flow resistance on the filtered liquid, leading to a decrease in the flow rate of the filtered liquid. In the separation membrane element, a gap is maintained between the separation membranes to decrease the flow resistance on the filtrate without providing such a member as spacer.

The gap 5 between the filtrate-side surfaces of the separation membranes is preferably in the range of 50 µm or more and 5,000 µm or less. If the gap between the separation membranes is more than 5,000 µm, bubbles formed by aeration performed during water treatment operation may hit the membrane surfaces strongly and cause damage to them. If the gap between the separation membranes is less than 50 µm, the space between the filtrate-side surfaces is so small that a large flow resistance will work on the filtered liquid to reduce the water flow rate of the filtered liquid. Thus, the constitution serves to stably maintain a flow channel for the filtered liquid, allowing the filtrate-side surfaces to be washed with chemicals. The gap between the separation membranes is more preferably 500 µm or more and 3,000 µm or less.

A flow channel may be formed by embedding a flow channel material such as net within the filtrate-side surface. However, such a net itself causes a flow resistance and, furthermore, it is necessary to embed a member processed for creating a flow channel, which will deteriorate the efficiency in maintaining a flow channel in spite of the increased entire thickness of the separation membrane element. In addition, washing of the filtrate-side surfaces with chemicals will apply pressure to the separation membranes from the filtrate side to inflate the bag formed of the separation membranes, possibly causing damage to the separation membranes.

If the ratio of the area of the resin members 7 to the area of the separation membrane 2 is small, there will be a risk that washing from the filtrate side with chemicals can cause the peeling of the separation membranes, while if it is large, the resin members may block the flow channel to decrease the flow rate of the filtered liquid. Accordingly, the proportion of the area of the internal resin members 7 to the area of the internal part of the separation membrane 2 is preferably 1% or more and 70% or less. It is more preferably 10% or more and 50% or less.

Described below is the plan-view shape of the resin member 7, that is, the shape of the resin member 7 projected onto the separation membrane. As an important point, resin is applied on the separation membranes 2 to form resin members 7 so that the resin works as interlining to make the separation membranes 2 and separation membrane element moderately flexible and rigid.

There are no specific limitations on the shape of the resin members 7 observed from above the membrane surface as long as the element has the intended effect. In the plan-view cross section given in FIG. 1 (a), for instance, the internal resin members 7 have an elliptic dot shape in the cross section. The plan-view cross-sectional shape of the internal resin members 7 is not limited to this example, and it may be dot-like such as circular, polygonal, and irregular, or linear such as straight, curved, wavy, zig-zag, and grid-like. Furthermore, there are no specific limitations on the arrangement of dot-like resin members, and they may be arranged in a grid-like or zigzag pattern.

Figure 2:
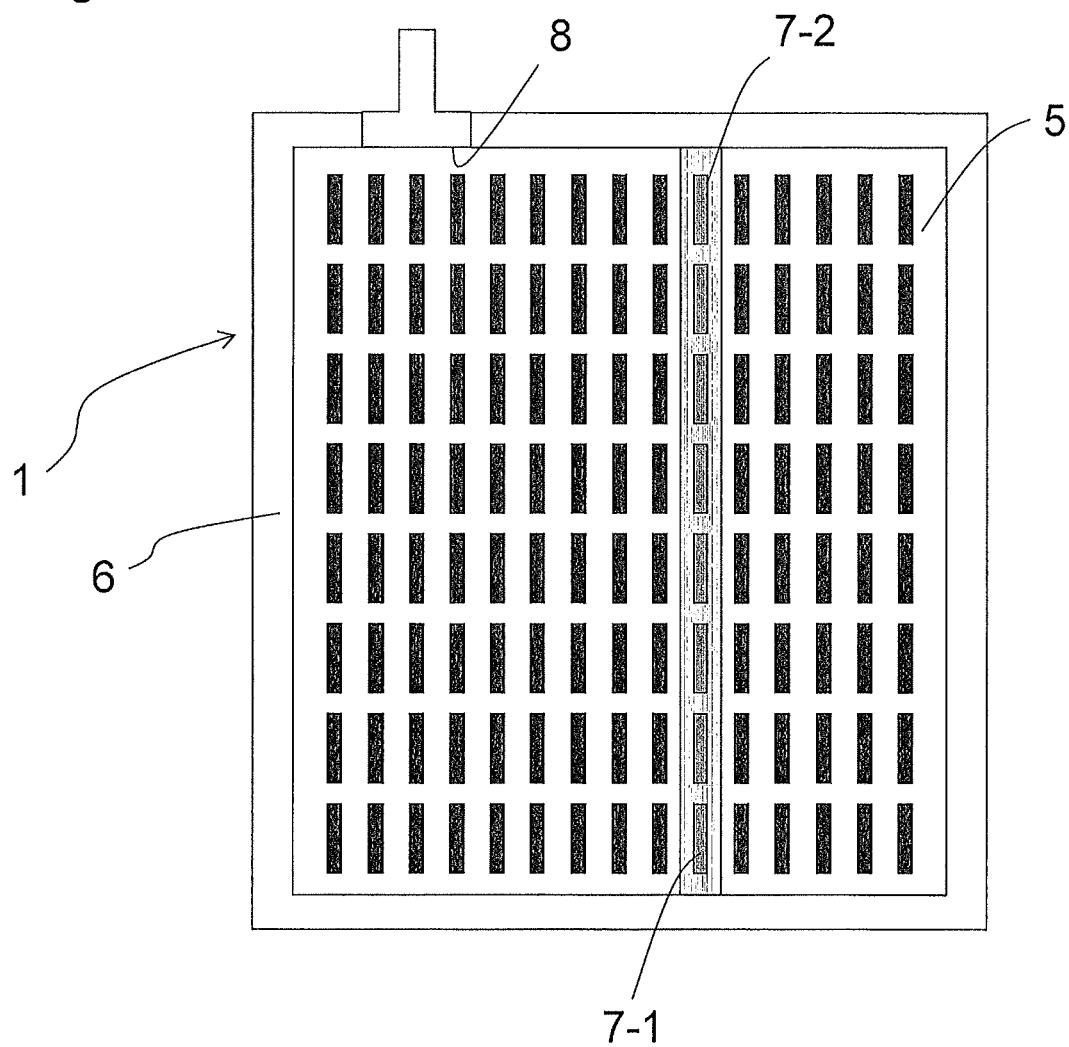
FIG. 2 shows a cross section schematically illustrating another example of our separation membrane element, and the cross section corresponds to the one shown in FIG. 1 (*a*).
Figure 3:
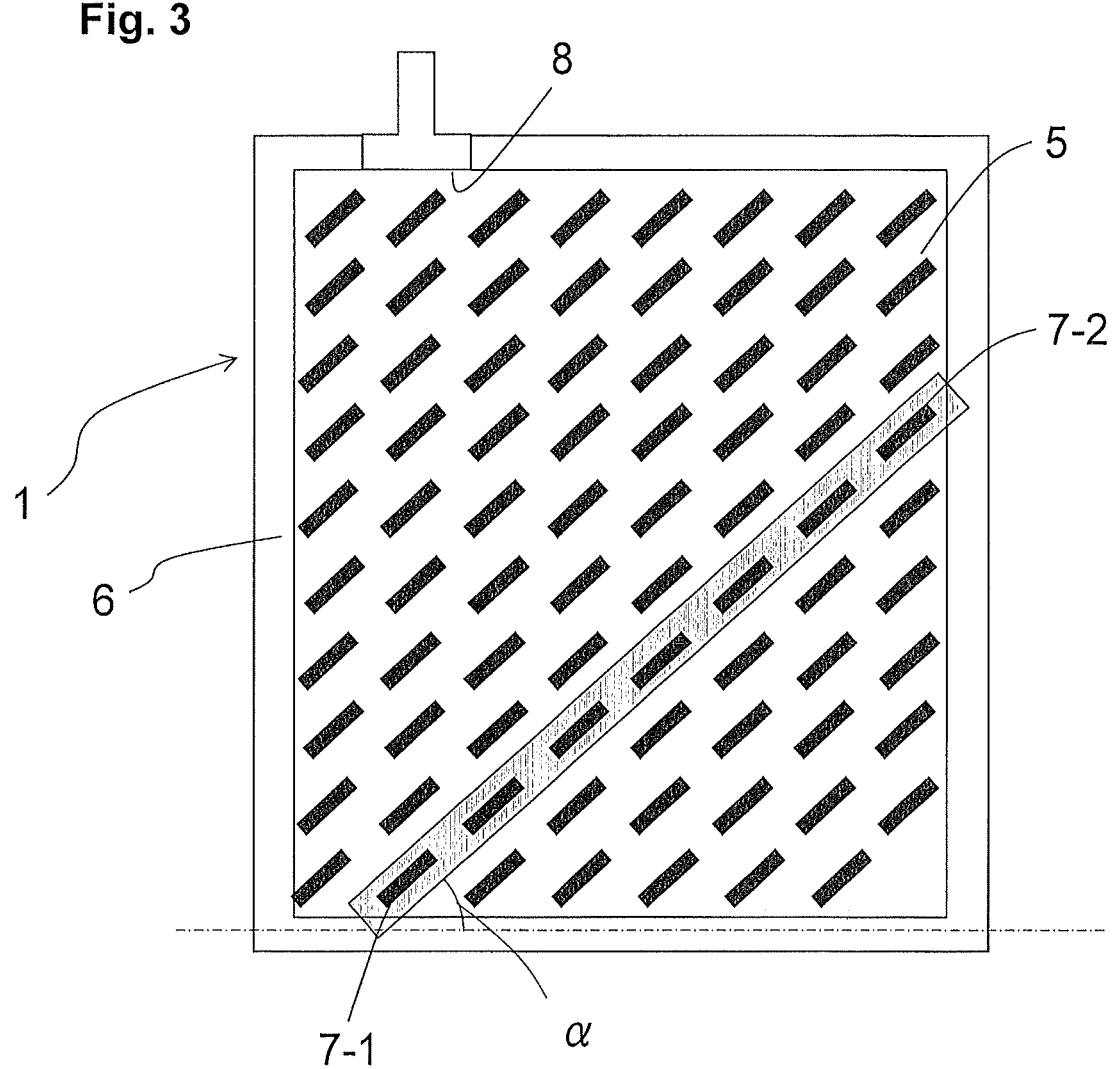
FIG. 3 shows a cross section schematically illustrating another example of our separation membrane element, and the cross section corresponds to the one shown in FIG. 1 (*a*).

In the example shown in FIG. 2, for instance, the resin members in a separation membrane element include resin members 7 that are arranged in a linear pattern in which they are aligned to form vertical broken lines that are parallel to each other. In FIG. 3, on the other hand, the resin members in a separation membrane element include resin members 7 that are arranged in a linear pattern in which they are aligned to form broken lines that are inclined at an angle of a and parallel to each other.

Figure 4:
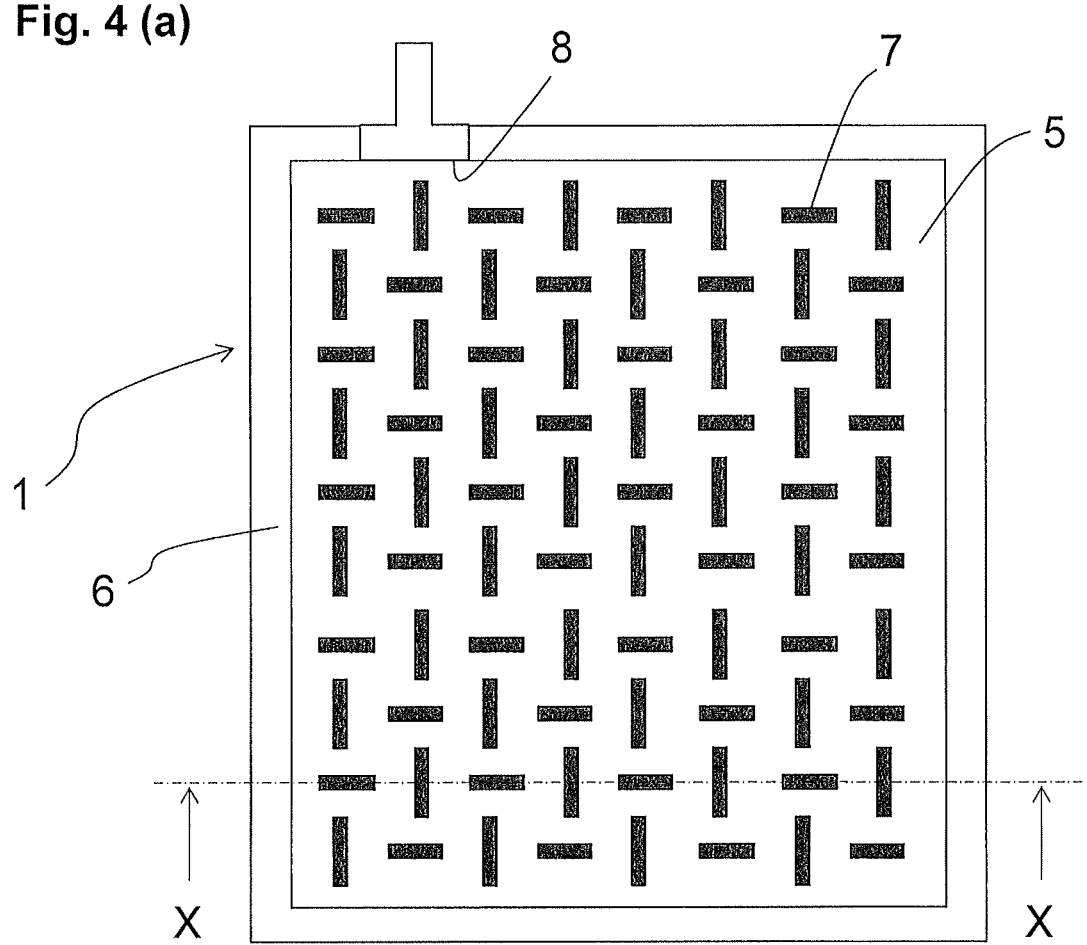
FIGS. 4 (*a*) and (*b*) show cross sections schematically illustrating another example of our separation membrane element, and the cross sections correspond to the ones shown in FIGS. 1 (*a*) and (*b*).
Figure 4:
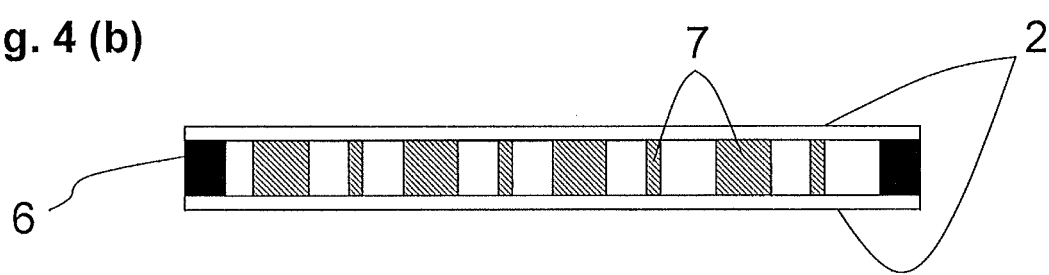
Figure 5:
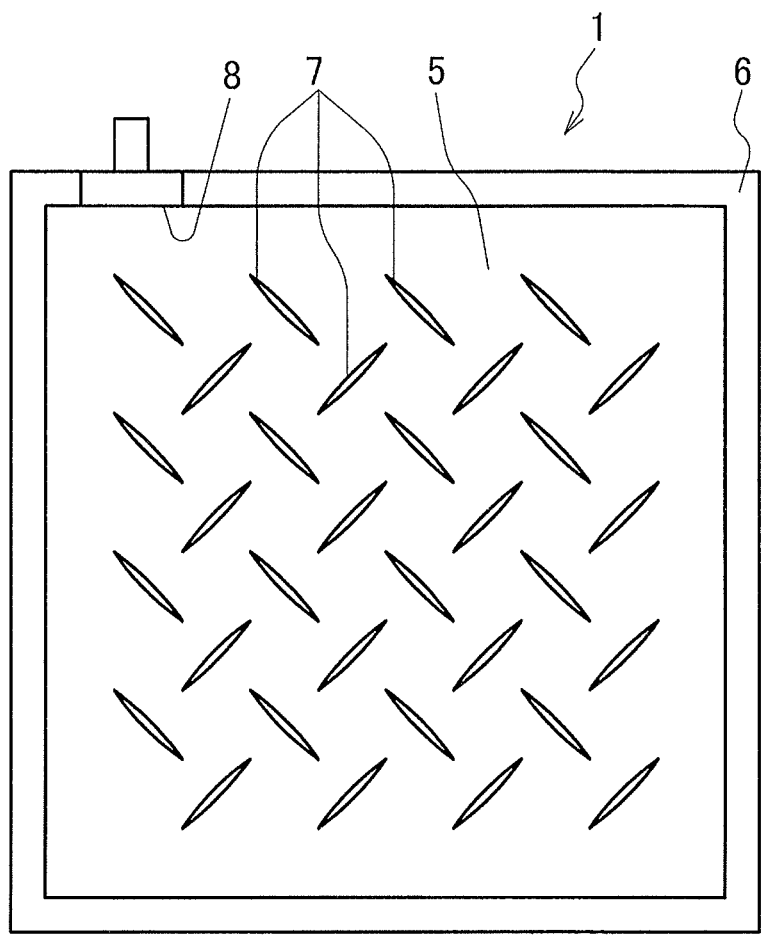
FIG. 5 shows a cross section schematically illustrating another example of our separation membrane element, and the cross section corresponds to the one shown in FIG. 1 (*a*).
Figure 6:
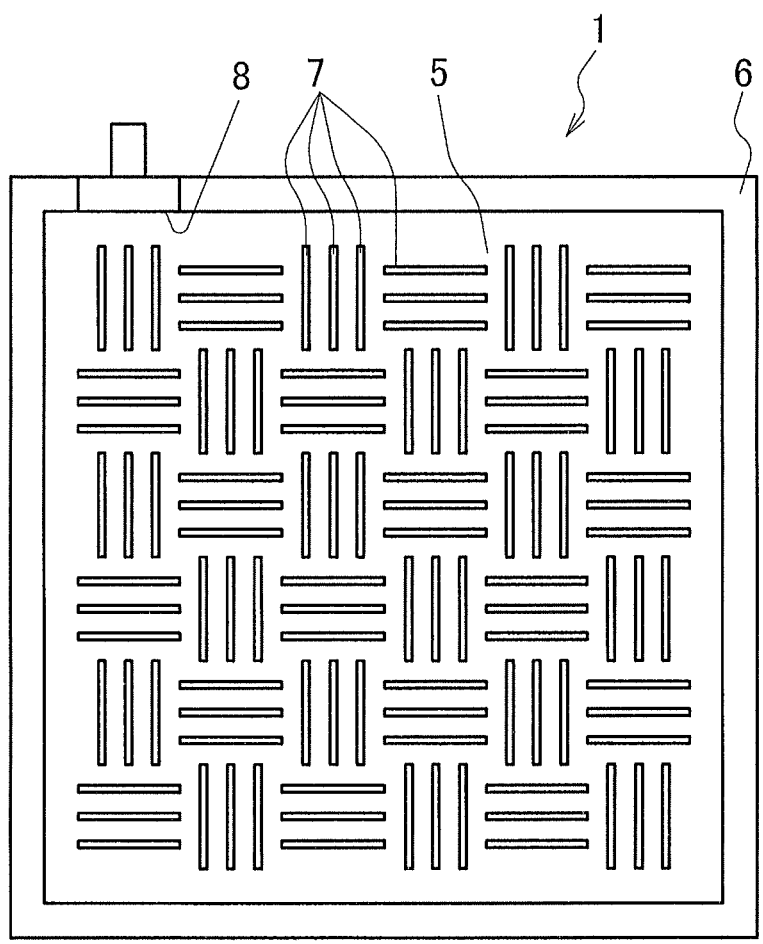
FIG. 6 shows a cross section schematically illustrating another example of our separation membrane element, and the cross section corresponds to the one shown in FIG. 1 (*a*).

In FIGS. 4 (a) and (b), the resin members in a separation membrane element include vertically aligned long linear resin members 7 and horizontally aligned short linear resin members 7 that form a checkered-steel-plate-like checkered pattern. In FIG. 5, the resin members in a separation membrane element include resin members 7 that have nearly the same lengths and form a checkered-steel-plate-like checkered pattern, with the length direction inclined at about 45° to the peripheral sealing member 6. In FIG. 6, the resin members in a separation membrane element include groups of resin members 7, each consisting of three vertically aligned linear ones or three horizontally aligned linear ones, that in combination form a checkered-steel-plate-like checkered pattern.

Figure 7:
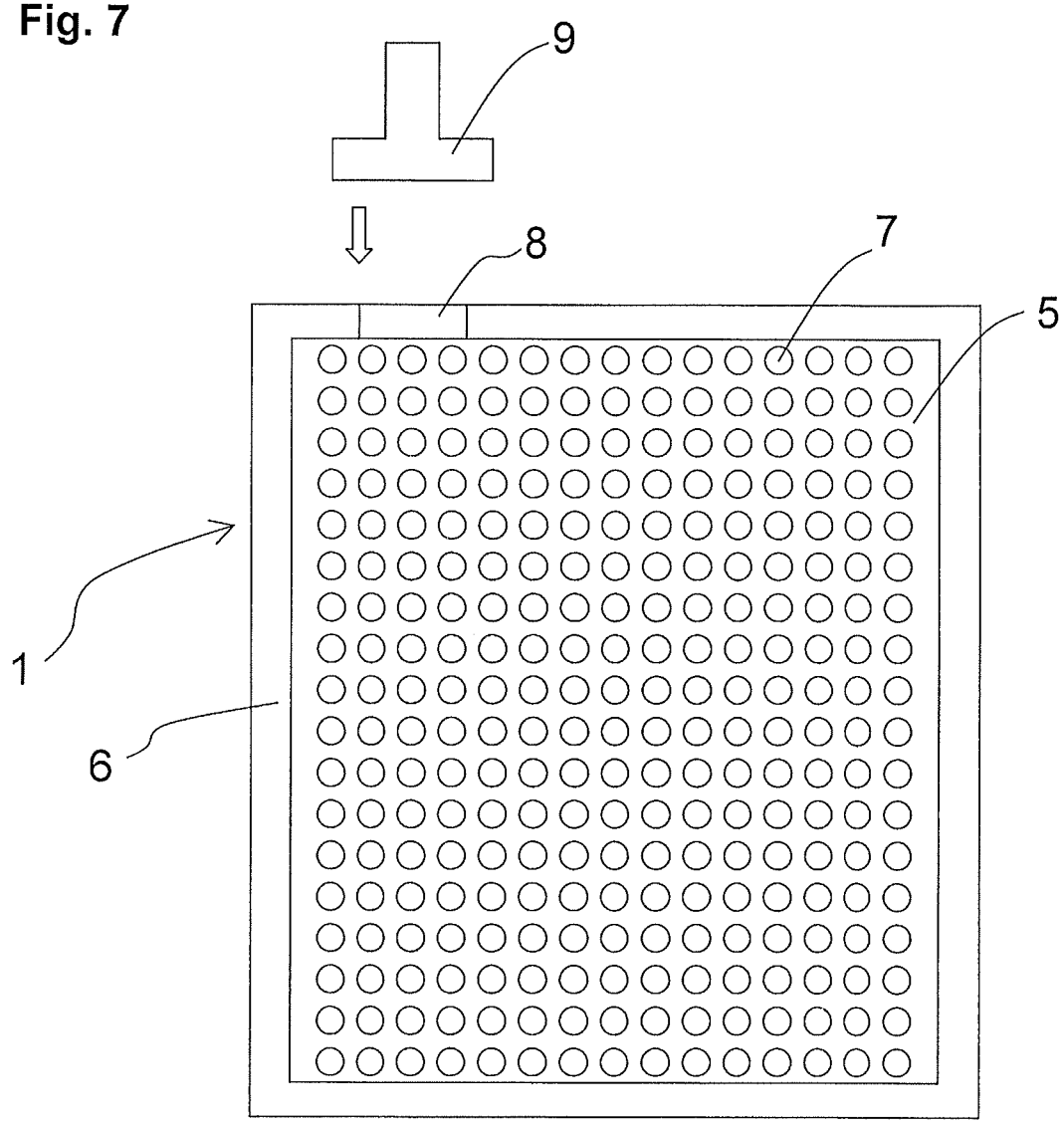
FIG. 7 shows a cross section schematically illustrating another example of our separation membrane element, and the cross section corresponds to the one shown in FIG. 1 (*a*).

In FIG. 7, the resin members in a separation membrane element include nearly circular resin members 7 that are orderly aligned in both the vertical and horizontal directions.

An element that meets specific requirements for separation characteristics and permeability can be designed by adjusting the shape of the internal resin members 7.

Furthermore, in the cross section shown in FIG. 1 (b), for instance, the shape of the resin members 7 in their thickness direction may be, for instance, circular, elliptic, square, rectangular, parallelogram, trapezoidal, or triangular. The side faces (i.e., the faces in contact with the gap 5) of the resin members, furthermore, may have various other shapes including concave, convex, curved, and planar.

The resin members 7 give discontinuous shadows when projected onto the separation membrane. This means that two or more resin members are formed on a separation membrane and they are spaced in the plane direction of the separation membrane. More specifically, 1 or more, 5 or more, or 10 or more resin members are preferably provided per 5 cm×5 cm square of the internal part of the filtrate-side surface of the separation membranes. On the other hand, the number of resin members provided per 5 cm×5 cm square is preferably 100 or less, 50 or less, or 30 or less.

The resin members 7 are preferably arranged in a checkered-steel-plate-like pattern to provide a separation membrane element with improved rigidity and durability.

A checkered-steel-plate-like pattern can be found on hot rolled steel plates with a checkered design that are generally used as flooring material. Different checkered steel plates have a variety of checkered patterns that differ in the number, length, angle, and check-to-check intervals in the checkered-steel-plate-like checkered pattern. The most important feature of the checkered-steel-plate-like checkered pattern is that the checkered pattern has no directionality (anisotropy). Specifically, as seen in FIG. 4 (a) for example, checks that are upwardly, downwardly, rightwardly, and leftwardly adjacent to each other are arranged in mutually difference directions (horizontal and perpendicular directions) to form a checkered pattern. A floor with checkered steel plates laid over the surface have uniform slipping properties in all directions.

If this checkered-steel-plate-like checkered pattern is applied to the shape of the resin members 7, that is, the shape of the shadow that each resin member projects on the plane of the separation membrane, the bonding lines will have no directionality, serving to provide a membrane element with further increased rigidity.

The term "bonding line" refers to a straight line along which the resin members 7 are aligned as can be seen, for instance, in FIGS. 2 and 3 in which the resin members 7 are aligned to form broken lines, each starting from an arbitrarily selected resin member 7-1, i.e., start point, that is located adjacent to the peripheral sealing member 6 of the element and reaching another resin member 7-2, i.e., end point, that is located adjacent to an opposite or neighboring part of the peripheral sealing member 6 of the element. The line extends from the start point in a vertical, horizontal, or inclined (at an arbitrary angle of a) direction to the end point, with resin members lining up on the straight line connecting the start point and the end point. The term "lining up" means that if the resin members existing between the start point and the end point have directionality, all the resin members existing between the start point and the end point are aligned with their length direction maintained parallel to the straight line connecting the start point and the end point.

For example, FIG. 2 shows a separation membrane element in which resin members 7 formed in a linear shape are arranged so that they line up vertically and horizontally, and the bonding line has directionality (anisotropy) since the resin members 7 have the same shape (direction). Compared to this, FIG. 5 shows an example of resin members 7 arranged in a checkered-steel-plate-like checkered pattern, in which resin members 7 of a linear shape are inclined at ±45° to the peripheral sealing member 6, and the bonding line has no directionality (anisotropy) since the resin members 7 have different shapes (length directions).

Thus, if the resin members are arranged in a checkered-steel-plate-like checkered pattern, there is no bonding line and the arrangement of the resin members has no directionality (i.e., isotropic). For sewage treatment applications that include aeration, in particular, the resin members are preferably arranged in a checkered-steel-plate-like checkered pattern because deflection can be depressed.

A typical checkered-steel-plate-like checkered pattern is composed of a group of short ridges A aligned in one direction and a group of short ridges B aligned in a direction perpendicular to the direction of the ridges A, with the ridges A and the ridges B being arranged alternately. The ridges A and the ridges B may be arranged so that they are aligned in nearly parallel and nearly perpendicular directions, respectively, to the sealing member 6 located along the periphery of the separation membrane, as shown in FIG. 4. Or, as shown in FIG. 5, the length directions of the ridges A and the ridges B may be inclined to the sealing member 6 located along the periphery of the separation membrane. In the example given in FIG. 5, the length directions of the ridges A and the ridges B are inclined by ±45° to the scaling member 6 located along the periphery of the separation membrane, thereby forming resin members 4. Here, the ridges A and the ridges B have the same length in the example given in FIG. 5.

Each of the ridges A and each of the ridges B may be alternately arranged in the vertical and horizontal directions as illustrated in FIG. 4, or groups of a plurality of ridges A and groups of a plurality of ridges B may be alternately arranged in the vertical and horizontal directions as illustrated in FIG. 6. Thus, there are no specific limitations on the cycle regularity and alignment regularity with respect to the direction and angle of the checks that are located adjacent to each other in the vertical and horizontal directions.

In regard to the direction of the checks, they may be in an arbitrary direction, such as parallel, perpendicular, or inclined by ±45° to the periphery of the membrane, but it is preferable for them to be nearly parallel or nearly perpendicular to the periphery of the membrane from the viewpoint of productivity. As described above, there are no specific limitations on the length, number, and intervals of the checks as long as they meet the required characteristics to provide a separation membrane 2 and separation membrane element with moderate flexibility and rigidity.

There are no specific limitations on the components constituting the peripheral sealing member 6 and the internal resin members 7, but from the viewpoint of chemical resistance, preferable ones include polyolefins and olefin copolymers such as ethylene vinyl acetate copolymer, polyethylene, polypropylene, and other polymers such as urethane resin and epoxy resin may also be used. It should be noted that if a thermoplastic polymer is used, shape forming can be performed easily and the resin can be shaped uniformly.

If thermoplastic polymer with a high softening point is used to form the sealing member 6 and resin members 7, there is a risk that the separation function layer 3 may be melted when the resin is bonded to the separation membrane 2, while if their softening temperature is too low, on the other hand, there is a risk that the inner layer of the separation membrane may be peeled during operation. Accordingly, it is preferable to use a thermoplastic polymer with a softening point of 80° C. to 200° C. as the resin to form the sealing member 6 and resin members 7. The softening point is defined as the temperature at which the resin starts to soften and deform, and it is measured by the ring and ball method. Specifically, preferable techniques include those specified in JIS K-2531, JIS K-2207/2425, JIS K6863-1994, and ASTM D-36. It is only necessary to have a softening point in the above range as measured by any of these techniques. It is more preferable that the softening point measured by the technique according to JIS K6863-1994 be in the above range.

A more concrete example of measuring procedure is described below. A ring with an inside diameter of 15.9 mm is filled with a specimen and left to stand to cool. The specimen is held horizontally in a silicone oil bath, and a copper ball with a diameter of 9.53 mm and a mass of 3.5 g is placed at the center of the specimen. As the bath temperature is increased at 5° C./min, the specimen gradually softens and flows down from the ring. The temperature at which the specimen or the ball touches the bottom plate of the ring stand is taken as the softening point. Here, the distance between the top face of bottom plate of the ring stand and the lower face of the ring is 25.4 mm and measurements are taken in an atmosphere with a temperature of 20±5° C. and a humidity of 70±5%.

There are no specific limitations on the method to be used to bond the resin members to portions of the periphery and internal part of the filtrate-side surfaces of the separation membranes, and the shapes of the resin members can be adjusted to meet requirements for separation characteristics and permeability by changing the treatment temperature and the type of resin to be adopted.

Note that the resin layer 6 and the resin members 7 may be formed of an identical resin or different resins. Furthermore, in the peripheral sealing member 6, which is intended for sealing, the separation membranes may be directly fusion-bonded without using resin, or they may be sealed by applying resin or an adhesive from outside.

The separation membranes are flat-shaped separation membranes and preferably those prepared by forming a separation function layer on a nonwoven fabric base.

In regard to the thickness of the separation function layer in a separation membrane, defects such as cracks can take place to reduce the filtering performance if it is too thin, while the water permeability can decrease if it is too thick, and accordingly, it is commonly 0.001 to 0.5 mm (1 μm to 500 μm), and preferably 0.05 to 0.2 mm (50 μm to 200 μm).

The separation function layer is preferably formed of a crosslinked polymer from the viewpoint of pore size control and durability. From the viewpoint of the separation performance for the components to be separated, preferable ones include organic/inorganic hybrid function layers and separation function layers produced by condensation-polymerizing a polyfunctional amine and polyfunctional acid halide on a porous support layer. Also usable is a porous support layer, such as cellulose membrane, polyvinylidene fluoride membrane, polyethersulfone membrane, and polysulfone membrane, that has both a separation function and a support function. Thus, a single layer composed of a separation function sublayer and a porous support sublayer may be used.

The separation membrane to be used to produce a separation membrane element preferably includes a base and a separation function layer, and in particular, it is preferred to use a separation membrane containing a separation function layer formed of a polyvinylidene fluoride based resin. It is preferable that a layer containing the base material and the resin used to form the separation function layer be interposed between the base and the separation function layer. As a polyvinylidene fluoride based blended resin enters the base through its surface, the separation function layer is firmly fixed to the base due to the so-called anchoring effect, serving to prevent the separation function layer from being removed from the base. The base may have a separation function layer on one surface, or may have two separation function layers on both surfaces. The structure of the separation function layer may be either symmetric or asymmetric with respect to the base. If separation function layers exist on both side of the base, furthermore, the separation function layers located on both sides may be either continuous with the base interposed in between or discontinuous.

In a separation membrane including a separation function layer and a base, the base functions to support the separation function layer to strengthen the separation membrane. There are no specific limitations on the material to be used for the base, and either an organic base material or an inorganic base material may be adopted, of which the use of an organic base material is preferable because it is easy to reduce the weight. Usable organic base materials include woven and knitted fabrics and nonwoven fabrics formed of organic fibers such as cellulose fiber, cellulose triacetate fiber, polyester fiber, polypropylene fiber, polyethylene fiber. Of these, the use of nonwoven fabrics is particularly preferable because their density can be controlled relatively easily.

Next, the method of producing the separation is explained below. This separation membrane can be produced by applying a membrane production stock solution containing a polyvinylidene fluoride based resin, pore forming agent and the like to either surface or both surfaces of a base, and coagulating it in a coagulation liquid containing a non-solvent to form a separation function layer. For this procedure, the applying of a membrane production stock solution to a surface of the base may be carried out by an appropriate means such as coating with the membrane production stock solution or immersion in the membrane production stock solution. When coating the base with the membrane production stock solution, the liquid may be applied to either only one surface of the base or both surfaces thereof. Alternatively, a separate separation function layer is formed first, followed by combining it with a base.

The subsequent coagulating of the membrane production stock solution may be carried out by either bringing only the film of the membrane production stock solution for separation function layer formation, which is formed on the base, in contact with a coagulation liquid or immersing the film of the membrane production stock solution for separation function layer formation, together with the base, in a coagulation liquid. The bringing of only the film of the membrane production stock solution for separation function layer formation in contact with a coagulation liquid can be carried out, for instance, by producing a film of the membrane production stock solution on a base, followed by bringing the film of the membrane production stock solution in contact with the surface of coagulating liquid in a coagulation bath, with the film facing down; or by bringing a base in contact with a smooth-surfaced plate such as glass plate and metal plate and bonding them such that the coagulation bath liquid will not get into the interface, followed by immersing the base, which has the plate and a film of the membrane production stock solution on its surfaces, in the coagulation bath. For the latter method, the film of the membrane production stock solution may be formed after bonding the base to the plate, or the film of the membrane production stock solution may be formed before bonding the base to the plate.

In addition to the aforementioned polyvinylidene fluoride based resin, the membrane production stock solution may also contain a pore forming agent and a solvent that dissolves them.

If a pore forming agent that acts to promote pore formation is to be added to the membrane production stock solution, the pore forming agent should be at least able to be extracted with the coagulation liquid and preferably has a high solubility in the coagulation liquid. For instance, an inorganic salt such as chloride calcium and calcium carbonate can be used. Also usable are polyoxyalkylenes such as polyethylene glycol and polypropylene glycol; water-soluble polymers such as polyvinyl alcohol, polyvinyl butyral, and polyacrylic acid; and glycerin. An appropriate pore forming agent may be selected arbitrarily to suit the type of resin used for the membrane production stock solution, but if a resin containing polyvinylidene fluoride as primary component is used, for instance, it is preferable to adopt a polymer containing polyethylene glycol as primary component, particularly a polymer containing polyethylene glycol with a weight average molecular weight of 10,000 or more as primary component, in consideration of the balance among the surface pore size, pore size distribution, and permeability.

A surface active agent containing a polyoxyalkylene structure, fatty acid ester structure, or hydroxyl group may also be used as pore forming agent. An intended porous structure will be achieved more easily by using a surface active agent.

Such polyoxyalkylene structures include —($CH_2CH_2O$)$_n$—, —($CH_2CH_2(CH_3)O$)$_n$—, —($CH_2CH_2CH_2O$)$_n$—, and —($CH_2CH_2CH_2CH_2O$)$_n$—, of which —($CH_2CH_2O$)$_n$—, or so-called polyoxy ethylene, is preferable from the viewpoint of hydrophilic properties.

Such fatty acid ester structures include fatty acid having a long chain aliphatic group. The long chain aliphatic group may be either a straight-chain one or a branched one, and such fatty acids include stearic acid, oleic acid, lauric acid, and palmitic acid. Also included are fatty acid esters derived from fat or oil, such as beef tallow, palm oil, and coconut oil.

Surface active agents containing a hydroxyl group include ethylene glycol, propylene glycol, 1,3-propanediol, 1,4-butanediol, glycerin, sorbitol, dextrose, and sucrose.

The surface active agent to be used as pore forming agent for the present invention preferably contains two or more of the following: polyoxyalkylene structure, fatty acid ester structure, and hydroxyl group.

In particular, a surface active agent that contains all the three components of polyoxyalkylene structure, fatty acid ester structure, and hydroxyl group is highly preferred. For instance, preferable polyoxyethylene sorbitan fatty acid esters include polyoxyethylene sorbitan monostearate, polyoxyethylene coconut oil fatty acid sorbitan, polyoxyethylene sorbitan monooleate, polyoxyethylene sorbitan monolaurate, polyoxyethylene sorbitan monopalmitate; and preferable polyoxyethylene fatty acid esters include polyethylene glycol monostearate, polyethylene glycol monooleate, and polyethylene glycol monolaurate. These surface active agents are particularly preferable not only because they can improve the dispersibility of inorganic fine particles but also because they will not deteriorate the permeability and blocking performance if left in the porous layer and dried there.

Furthermore, after producing a separation membrane, these surface active agents can be used in such a manner that they are dried after being spread over the separation membrane, thus serving to avoid a decrease in permeability and blocking performance.

In addition, if a solvent that dissolves the polyvinylidene fluoride based resin, other organic resins, pore forming agent and the like is to be added to the membrane production stock solution, useful solvents for this purpose include N-methyl pyrolidone (NMP), N,N-dimethyl acetamide (DMAc), N,N-dimethyl formamide (DMF), dimethyl sulfoxide (DMSO), acetone, and methyl ethyl ketone. Of these, NMP, DMAc, DMF, and DMSO are preferable because their high solubility in polyvinylidene fluoride based resins.

In addition, a non-solvent may also be added to the membrane production stock solution. The non-solvent should be one that does not dissolve the polyvinylidene fluoride based resin or other organic resins, and acts to control the size of the pores by controlling the speed of coagulation of the polyvinylidene fluoride based resin and other organic resins. Usable non-solvents include water and alcohols such as methanol and ethanol. Of these, water and methanol are preferable from the viewpoint of price and easiness of waste water treatment. A mixture thereof may also be used.

In regard to the composition of the membrane production stock solution, the polyvinylidene fluoride based resin preferably accounts for 5 wt % to 30 wt %, the pore forming agent for 0.1 wt % to 15 wt %, the solvent for 45 wt % to 94.8 wt %, and the non-solvent for 0.1 wt % to 10 wt %. In particular, the polyvinylidene fluoride based resin more preferably accounts for 8 wt % to 20 wt % because the porous layer will be low in strength if its content is extremely small while the permeability may decrease if it is too large. The permeability will decrease if the content of the pore forming agent is too small, while the porous layer will be low in strength if it is too large. If it is extremely large, furthermore, the agent will remain in excessive amounts in the polyvinylidene fluoride based resin and will be eluted out during use, possibly leading to deterioration in the filtrate quality or variations in permeability. Accordingly, the agent content is preferably 0.5 wt % to 10 wt %. The stock solution will gelate more easily if the solvent content is too small, while the porous layer will be low in strength if it is too large. The solvent content is more preferably 60 wt % to 90 wt %. Furthermore, the stock solution will gelate more easily if the non-solvent content is too large, while it will be difficult to control the pores and macrovoids if it is extremely small. Accordingly, the non-solvent content is preferably 0.5 wt % to 5 wt %.

For a coagulating liquid in the coagulation bath, on the other hand, a non-solvent or a mixed solution containing a non-solvent and a solvent may be used. If a non-solvent is used also in the membrane production stock solution, the non-solvent in the coagulating liquid preferably accounts for at least 80 wt % of the coagulating liquid. If its content is too small, the coagulation speed of the polyvinylidene fluoride based resin will be low, possibly leading to a large pore size. The non-solvent content in the coagulating liquid is more preferably 85 wt % to 100 wt %. If the membrane production stock solution contains no non-solvent, on the other hand, the non-solvent content in the coagulating liquid is preferably smaller as compared with the case where a non-solvent is contained also in the membrane production stock solution. The non-solvent content in the coagulating liquid is preferably not more than 40 wt %. If the non-solvent content is large, the coagulation speed of the polyvinylidene fluoride based resin will increase, possibly making the porous layer surface dense and leading to a decreased permeability. The non-solvent content is more preferably 1 wt % to 40 wt %. The pore size and macrovoid size at the surface of the porous layer can be controlled by adjusting the non-solvent content in the coagulating liquid. The coagulation speed will be too fast if the temperature of the coagulating liquid is too high, while the coagulation speed will be too slow if it is too low, and commonly, the temperature is preferably controlled at 15° C. to 80° C. It is more preferably 20° C. to 60° C.

Note that any of reverse osmosis membrane, nanofiltration membrane, ultrafiltration membrane, and microfiltration membrane may be applied to the separation membrane element according to the present invention. An appropriate one or more of the membranes may be selected and combined depending on the size of the substances to be separated, but for sewage water treatment, in particular, the use of ultrafiltration membrane or microfiltration membrane is preferable.

When using the separation membrane element according to the present invention, a water collecting port 9 may be provided in the separation membrane element so that the filtrate filtered by the separation membrane will flow through the gap space among the resin members 7 and run out of the separation membrane element through the water collecting port 9.

There are no specific limitations on the type of separation membrane element to be used, and useful ones include flat membrane type element, spiral type element, and pleat type element, but the use of a flat plate type membrane element is preferable from the viewpoint of the quality of raw water that will undergo sewage water treatment.

There are no specific limitations on the position of the water collecting member 8 used in the separation membrane element 1, and it may be located either at the edge of the element or in the interior thereof unless the intended effect is impaired. For instance, as an embodiment of the separation membrane element designed suitably for sewage water treatment, a water collecting member 8 may be provided at the edge of the separation membrane element, which is fixed to a fixing jig 23 that supports the water collecting port 9.

Figure 8:
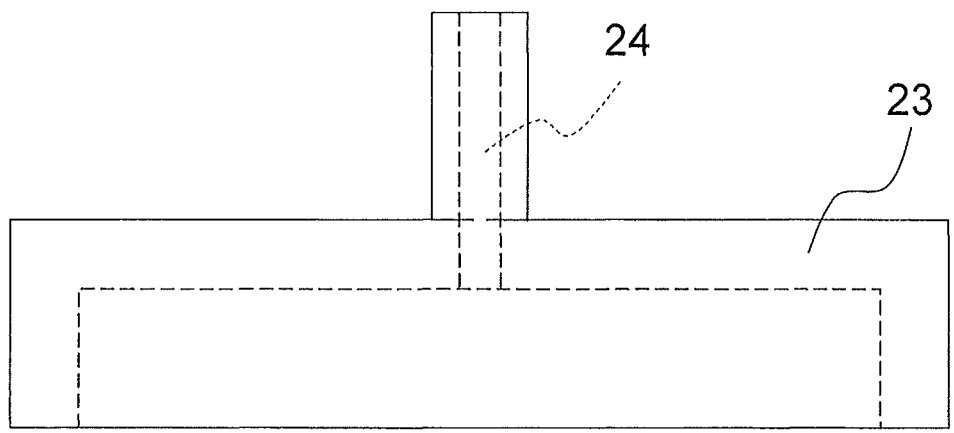
FIG. 8 gives a plan view illustrating a water collecting port provided in a membrane element.

For instance, the separation membrane element may be a separation membrane element 1 as shown in FIGS. 1 (*a*) and (*b*) provided with a fixing jig 23 and water collecting port 9 as shown in FIG. 8. The fixing jig 23 is installed on the periphery of the separation membrane element 1 (along a side of the rectangular separation membranes) in such a manner that it is inserted between the separation membranes 2 of the separation membrane element 1. The fixing jig 23 contains a water collecting pipe 24 that passes through it, and the end of the water collecting pipe 24 functions as water collecting port 9. The filtrate flows through the gap 5 and runs out of the separation membrane element 1 through the water collecting pipe 24. Note that the position of the water collecting member 8 is not limited to the edge of the separation membrane element as described above, and it may be located in the interior region.

Figure 9:
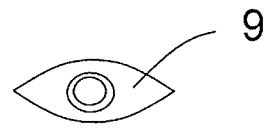
FIGS. 9 (*a*) and (*b*) all schematic diagrams illustrating another water collecting port.
Figure 9:
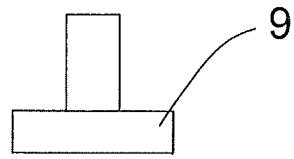

In FIG. 7, another type of water collecting port 9 and a separation membrane element 1 are shown side-by-side. FIGS. 9 (*a*) and (*b*) give a plan view and a front view, respectively, of this water collecting port 9.

Shown in FIGS. 9 (*a*) and (*b*) is an embodiment of the water collecting port used in the present invention. The water collecting port 9 is composed of an upper and a lower hollow part. The lower part of the water collecting port 9 has two curved faces to form a hollow. An open space is given below while its top is closed by a nearly flat plane, with an opening formed nearly at the center of this top plane to allow an elliptic tube (upper hollow member) to be connected to this opening. A water collecting port 9 having a shape as shown in FIGS. 9 (*a*) and (*b*) serves to seal the water collecting port 9 and the sealing member 6 while preventing wrinkles from being caused when the separation membrane element 1 is fixed to the water collecting member 8. There are no specific limitations on the method to be used for this sealing, and it may be achieved by heat welding or bonding with an adhesive. Heat welding and adhesive bonding may be carried out in combination to ensure firmer sealing. There are no specific limitations on the shape of the fixing portion, and an appropriate shape may be selected to suit the size of the separation membrane element 1, the size and shape of the water collecting port 9, etc.

Described next is an example of a module including a plurality of stacked duplicates of the separation membrane element 1. Being free of support plates, the separation membrane element can be small in total thickness, leading to a large membrane area (packing factor of separation membrane) per unit area of membrane module installation. However, the separation membrane element 1 is provided with the water collecting port 9. Therefore, the arrangement of the water collecting port, rather than that of the membrane itself, will be a more important issue in increasing the packing factor of the separation membrane element 1. Thus, a feature of the separation membrane module is that the water collecting ports of adjacent elements are arranged so that they will not interfere with each other.

Figure 10:
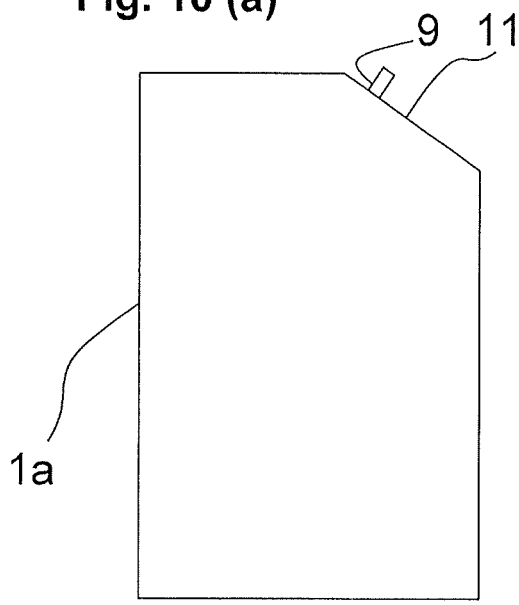
FIGS. 10 (*a*) and (*b*) are schematic diagrams illustrating an example of our separation membrane element, and FIG. 10 (*c*) is a schematic top view of an array of separation membrane elements illustrated in FIGS. 10 (*a*) and (*b*) arranged alternately.
Figure 10:
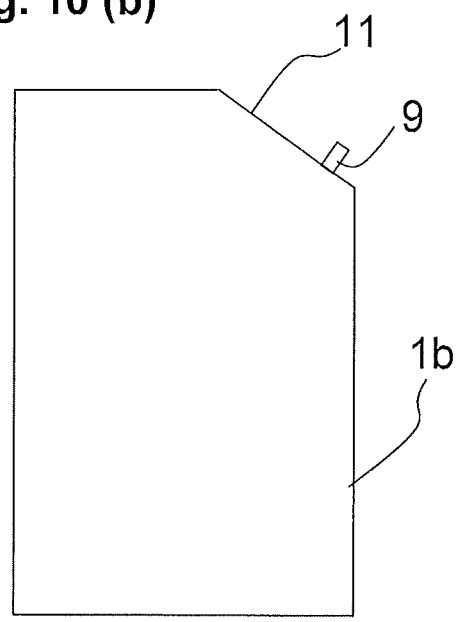
Figure 10:
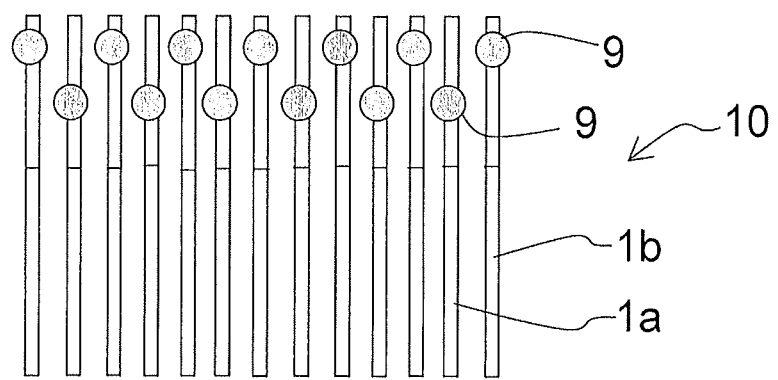

FIGS. 10 (*a*) and (*b*) show two separation membrane elements. They differ in the position where the water collecting port 9 is provided. Thus, the water collecting port 9 of the separation membrane element 1*a* in diagram (a) is located at a different position from that of the water collecting port 9 of the separation membrane element in 1*b* diagram (b). When constructing a membrane module 10, the interference between the water collecting ports of adjacent elements (increase in bulkiness due to their overlap) can be avoided by stacking the elements in such a manner that adjacent water collecting port 9 are located at two different positions alternately. This allows the elements to be arranged at smaller intervals. FIG. 10 (*c*) gives a schematic top view of a separation membrane module 10 that includes a plurality of separation membrane elements 1*a* and *l* b arranged alternately. Note that FIGS. 10 (*a*) to (*c*) are intended only to show an example, and other structures may be adopted as long as the water collecting ports 9 are arranged so that adjacent ones do not interfere each other.

Each of the separation membrane elements 1*a* and 1*b* described in FIGS. 10 (*a*) and (*b*) includes a flat separation membrane having a rectangular shape with a beveled side 11 where a water collecting member and a water collecting port 9 are formed. Thus forming such a beveled side 11 and providing a water collecting port 9 on the beveled side 11 serves not only to allow the position of the water collecting port to be easily identified during the construction process, but also to avoid an excessive force being applied to the water collecting port when installing a water collecting pipe on a side face of the membrane element and connecting this water collecting pipe to each water collecting port via a tube or the like, thereby preventing the bond between the water collecting port and the membrane element from being separated or destroyed.

A plurality of such membrane elements may be accommodated in a housing to form a membrane module. Structurally, a membrane module contains a plurality of membrane elements fixed in a parallel arrangement. Such a membrane module may be immersed in a tank containing treatment water such as waste water to serve for membrane filtration. The membrane element and membrane module may be provided with a fluid collecting means designed to collect the filtrate coming through the separation membranes, thereby serving as a liquid treatment apparatus for treatment of sewage water and the like.

Figure 11:
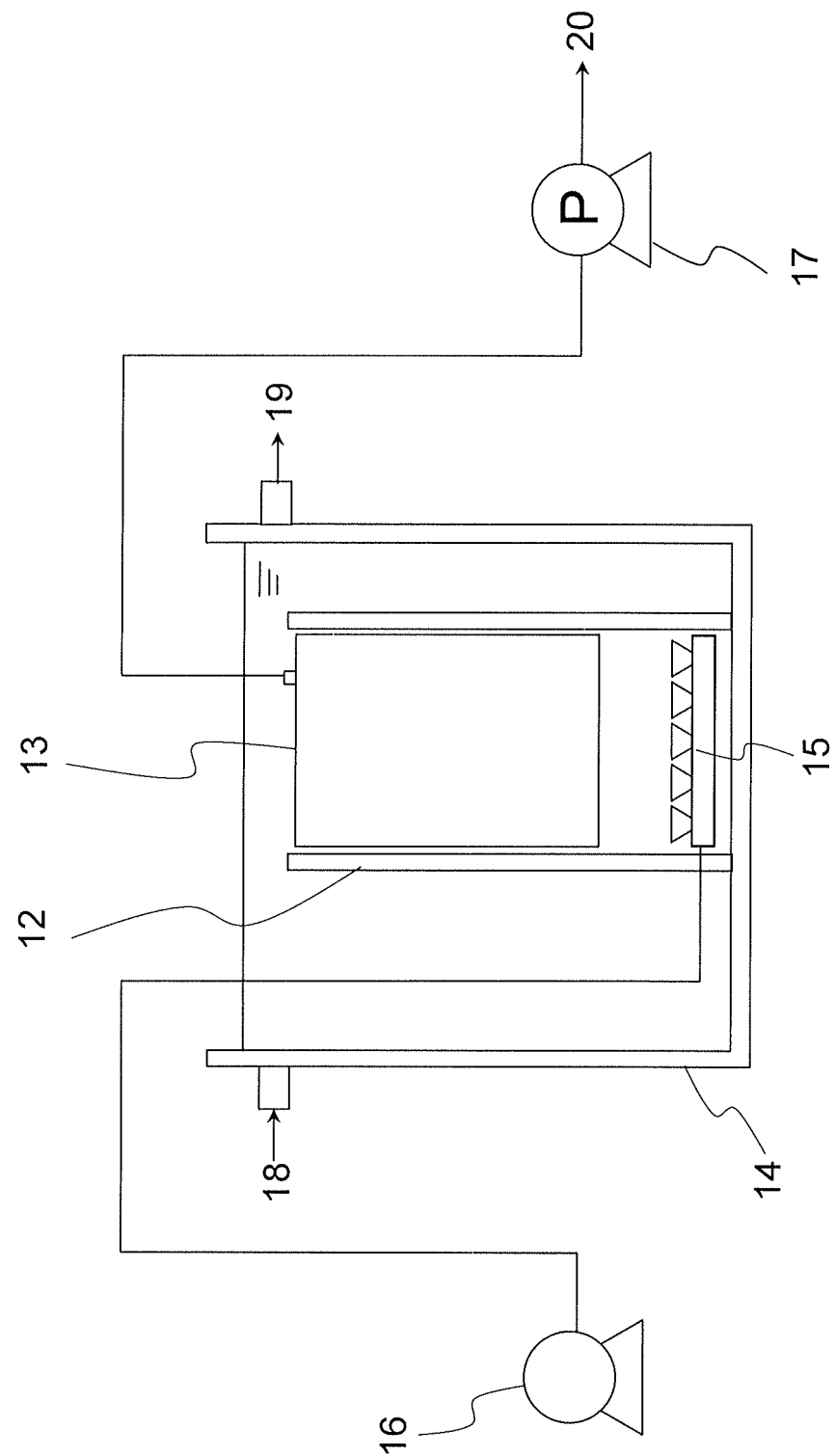
FIG. 11 is a schematic diagram illustrating a water treatment apparatus that uses a membrane module containing our separation membrane element.

Next, a method of using the membrane module is described with reference to the sewage water treatment apparatus illustrated in FIG. 11. The membrane module 12 shown in FIG. 11 includes a plurality of membrane elements 13 that are parallel to each other and arranged in a housing so that a gap is maintained between the membranes of adjacent membrane elements 13. This membrane module is used after immersing it in treatment water, such as organic waste water, that is stored in a membrane-immersed water tank 14. In the interior of the membrane module 12, a plurality of membrane elements 13 are installed in the vertical direction and an air diffusing apparatus 15 is provided therebelow. The air diffusing apparatus 15 receives gas from a blower 16 and supplies it to the membrane surface of the separation membrane. In addition, a pump 17 that sucks the filtrate 20 is provided on the downstream side of the membrane module 12.

In a sewage water treatment apparatus thus configured, treatment water such as waste water passes through the separation membranes of the membrane elements 13 as it is sucked by the pump 17. During this process, suspended substances such as microbial particles and inorganic substance particles contained in the treatment water are filtered out. Then, the filtrate passing through the separation membranes flows downstream of the filtrate-side surfaces of the separation membranes, passes through the water collecting ports provided at the edge of the elements, and runs out of the treatment water tank through the pump 17. At the same time, the air diffusing apparatus 15 generates bubbles while the water is filtered, and upward flows parallel to the membrane surfaces of the membrane elements are caused by the air-lift effect of the bubbles to remove the filtered-out substances deposited on the membrane surfaces.

Needless to say, the treatment water is not limited to sewage water. The membranes can be used for clarification of water, purification of water, drainage treatment, and industrial water production in the field of water treatment, and the treatment water may be, for instance, river water, lake water, underground water, sea water, sewage water, and drainage water.

EXAMPLES

For the examples and comparative examples given below, the water permeability of the separation membranes, surface area proportion of the internal resin members, gap between filtrate-side surfaces, planar shape of the internal resin members, intervals of the internal resin members, and cross-sectional shape of the internal resin members were measured as follows.

Water Permeability of an Element

Two 12 cm×12 cm specimens were cut out of a separation membrane prepared by a procedure as described later, and a separation membrane element was produced by the procedure described for each example or comparative example. A fixing jig provided with a water collecting port is attached to the resulting separation membrane element, which is then immersed in a water tank with a height of 20 cm, width of 20 cm, and depth of 20 cm, and preliminary distilled water of 25° C. is passed at a hydraulic head of 1 m for 5 minutes.

Subsequently, distilled water is passed and the filtrate is collected for 5 minutes to determine the water permeability.

Surface Area Proportion of the Internal Resin Members

A 5 cm×5 cm square was cut out from an internal portion of the separation membrane element where a resin member is provided, and its image was taken by a commercial image scanner, followed by binarizing the image based on the brightness difference to determine the surface area in the planar direction of each resin member. The total area, which was assumed to represent the projected area of the resin members projected in the direction perpendicular to the membrane surface, was divided by the area of the membrane that includes the projected area (i.e., 25 cm$^2$) to calculate the proportion (ratio, area %).

Gap Between Filtrate-Side Surfaces

From a through-thickness cross section of a separation membrane element, the gap between two separation membranes was determined with a microscope (model VHX-1100, manufactured by Keyence Corporation).

Planar Shape of Internal Resin Members

For the internal part of a separation membrane element where resin members were provided, an image was taken by a commercial image scanner, and the image was binarized based on the brightness difference, followed by visual observation to determine the rough planar shape of each resin member. For each resin member, the maximum size across the resin-containing portion (excluding the resin-free portion) was taken as its length while the size across the resin member (including the resin-free portion) at center of perpendicular to the length direction was taken as its breadth, followed by calculating the average. The calculated average between the length and breadth of the resin member was rounded off to the nearest tenth.

Interval Between Internal Resin Members

For the internal part of a separation membrane element where resin members were provided, an image observed in the vertical direction to the surface of the separation membrane element was taken by a commercial image scanner, and the image was binarized based on the brightness difference, followed by measuring the minimum distance between each resin member and the adjacent resin members and calculating the average. The calculated average distance between the resin members was rounded off to the nearest tenth.

Cross-Sectional Shape of Internal Resin Members

A through-thickness cross section of a separation membrane element was observed visually to determine the rough cross-sectional shape of the resin members.

Example 1

Polyvinylidene fluoride (PVDF, weight average molecular weight 280,000) was used as the resin component of a membrane production stock solution. Furthermore, polyethylene glycol (PEG20,000, weight average molecular weight 20,000) was used as pore forming agent, N,N-dimethyl formamide (DMF) as solvent, and H$_2$O as non-solvent. These were stirred sufficiently at a temperature of 95° C. to prepare a membrane production stock solution with the following composition.
polyvinylidene fluoride (PVDF): 13.0 wt %
polyethylene glycol (PEG20,000): 5.5 wt %
N,N-dimethyl formamide (DMF): 78.0 wt %
H$_2$O: 3.5 wt %

A rectangular piece of a polyester fiber based nonwoven fabric having a density of 0.42 g/cm$^3$ and a size of 50 cm width×150 cm length was adopted as base, and the above membrane production stock solution was spread over the base after being cooled to 30° C., immediately followed by immersion in pure water at 20° C. for 5 minutes and immersion in hot water at 90° C. for 2 minutes to remove the N,N-dimethyl formamide used as solvent and the polyethylene glycol used as pore forming agent. Subsequently, it was immersed in a 20 wt % aqueous solution of a surface active agent (polyoxyethylene sorbitan monooleate) for 30 minutes and dried by a hot air drier at 75° C. for 30 minutes to produce a separation membrane.

Then, two 12 cm×12 cm specimens were cut out of the resulting separation membrane. One of the separation membrane specimens were taken and an ethylene vinyl acetate copolymer resin (trade name 703A, manufactured by Tex Year Industries Inc., softening point 96° C.) was spread on its filtrate-side surface using a hot melt applicator (model CF-03SS-S, manufactured by Suntool Corporation) at a resin temperature of 120° C. and a traveling speed of 12 m/min. Here, the resin was applied to a width of about 5 mm and a height of about 3 mm on the circumferential portion, that is, the peripheral sealing member of the separation membrane. In the internal part, furthermore, the resin was applied in a dotted pattern with a length of about 4 mm, width of about 3 mm, longitudinal intervals of about 8 mm, lateral intervals of about 4 mm, and height of about 1 mm.

Subsequently, the other separation membrane specimen was put on this separation membrane so that their filtrate-side surfaces faced each other, and an aluminum plate was provided as spacer along the periphery of these separation membrane specimens. These two separation membrane specimens combined with a spacer were sandwiched between two aluminum plates with a thickness of 3 mm and left in an oven at 85° C. for 30 minutes to ensure adhesion of the resin to the filtrate-side surfaces of the separation membrane specimens.

In the resulting separation membrane element, the gap between the filtrate-side surfaces was 0.5 mm (500 μm). The internal resin members had a roughly elliptic shape with a length of 8.0 mm and a breadth 4.5 mm, and they were arranged in an dotted pattern with longitudinal intervals of 4.0 mm and lateral intervals of 2.5 mm, with a surface area proportion of 35% (see FIG. 1). Note that the internal resin members had roughly rectangular cross sections.

Furthermore, a fixing jig for water collecting port was attached to the edge, and the water permeability (water passage rate) of the separation membranes was measured and found to be 24.8×10$^{-9}$ m$^3$/m$^2$/s/Pa. Measurements of the surface area proportion of resin members, gap between filtrate-side surfaces, and water permeability are listed in Table 1 (FIG. 12).

Example 2

An element was prepared by the same procedure as in Example 1 except that the coating height of the ethylene vinyl acetate copolymer resin and the thickness of the aluminum plate spacer were adjusted so that the gap between the filtrate-side surfaces of the separation membranes would be 0.05 mm (50 μm), and its evaluation showed that the internal resin members had a roughly elliptic shape with a length of 8.0 mm and a breadth of 4.5 mm and that they were arranged in a dotted pattern with a longitudinal interval of 4.0 mm and lateral interval of 2.5 mm, with a surface area proportion of 35% (see FIG. 1). Note that the internal resin members had roughly rectangular cross sections. The separation membrane had a water permeability of 24.6×10$^{-9}$ m$^3$/m$^2$/s/Pa, which is lower than in Example 1. Measurements of the surface area proportion of resin members, gap between filtrate-side surfaces, and water permeability are listed in Table 1 (FIG. 12).

Example 3

A separation membrane element was prepared by the same procedure as in Example 1 except that the coating height of the ethylene vinyl acetate copolymer resin and the thickness of the aluminum plate spacer were adjusted so that the gap between the filtrate-side surfaces of the separation membranes would be 2 mm (2,000 μm), and its evaluation showed that the internal resin members had a roughly elliptic shape with a length of 8.0 mm and a breadth of 4.5 mm and that they were arranged in a dotted pattern with longitudinal intervals of 4.0 mm and lateral intervals of 2.5 mm, with a surface area proportion of 35% (see FIG. 1). Note that the internal resin members had roughly rectangular cross sections. The separation membrane had a water permeability of $25.8 \times 10^{-9}$ m$^3$/m$^2$/s/Pa, which is nearly at the same level as in Example 1. Measurements of the surface area proportion of resin members, gap between filtrate-side surfaces, and water permeability are listed in Table 1 (FIG. 12).

Example 4

A separation membrane element was prepared by the same procedure as in Example 1 except that the coating height of the ethylene vinyl acetate copolymer resin and the thickness of the aluminum plate spacer were adjusted so that the gap between the filtrate-side surfaces of the separation membranes would be 5 mm (5,000 μm), and its evaluation showed that the internal resin members had a roughly elliptic shape with a length of 8.0 mm and a breadth of 4.5 mm and that they were arranged in a dotted pattern with longitudinal intervals of 4.0 mm and lateral intervals of 2.5 mm, with a surface area proportion of 35% (see FIG. 1). Note that the internal resin members had roughly rectangular cross sections. The separation membrane had a water permeability of $25.5 \times 10^{-9}$ m$^3$/m$^2$/s/Pa, which is nearly at the same level as in Example 1. Measurements of the surface area proportion of resin members, gap between filtrate-side surfaces, and water permeability are listed in Table 1 (FIG. 12).

Example 5

A separation membrane element was prepared by the same procedure as in Example 1 except that the dot size and the longitudinal and lateral intervals of the ethylene vinyl acetate copolymer resin coating were changed so that the surface area proportion of the internal resin members would be 1%, and its evaluation showed that the internal resin members had a roughly circular shape with a length of 1.1 mm and a breadth of 1.1 mm and that they were arranged in a dotted pattern with longitudinal intervals of 9.4 mm and lateral intervals of 8.3 mm. Note that the internal resin members had roughly elliptic cross sections. The separation membrane had a water permeability of $24.7 \times 10^{-9}$ m$^3$/m$^2$/s/Pa, which is nearly at the same level as in Example 1. Measurements of the surface area proportion of resin members, gap between filtrate-side surfaces, and water permeability are listed in Table 1 (FIG. 12).

Example 6

A separation membrane element was prepared by the same procedure as in Example 3 except that the gap between the filtrate-side surfaces of the separation membranes was adjusted to 2 mm (2,000 μm) and that the dot size and the longitudinal and lateral intervals of the ethylene vinyl acetate copolymer resin coating and the thickness of the aluminum plate spacer were changed so that the surface area proportion of the internal resin members would be 5%, and its evaluation showed that the internal resin members had a roughly elliptic shape with a length of 2.6 mm and a breadth of 1.8 mm and that they were arranged in a dotted pattern with longitudinal and lateral intervals of 7.5 mm. Note that the internal resin members had roughly elliptic cross sections. Note that the internal resin members had roughly rectangular cross sections. The separation membrane had a water permeability of $25.1 \times 10^{-9}$ m$^3$/m$^2$/s/Pa, which is nearly at the same level as in Example 3. Measurements of the surface area proportion of resin members, gap between filtrate-side surfaces, and water permeability are listed in Table 1 (FIG. 12).

Example 7

A separation membrane element was prepared by the same procedure as in Example 3 except that the gap between the filtrate-side surfaces of the separation membranes was adjusted to 2 mm (2,000 μm) and that the dot size and the longitudinal and lateral intervals of the ethylene vinyl acetate copolymer resin coating were changed so that the surface area proportion of the internal resin members would be 20%, and its evaluation showed that the internal resin members had a roughly elliptic shape with a length of 5.1 mm and a breadth of 3.6 mm and that they were arranged in a dotted pattern with longitudinal intervals of 5.6 mm and lateral intervals of 3.7 mm. Note that the internal resin members had roughly rectangular cross sections. The separation membrane had a water permeability of $25.9 \times 10^{-9}$ m$^3$/m$^2$/s/Pa, which is nearly at the same level as in Example 3. Measurements of the surface area proportion of resin members, gap between filtrate-side surfaces, and water permeability are listed in Table 1 (FIG. 12).

Example 8

A separation membrane element was prepared by the same procedure as in Example 3 except that the gap between the filtrate-side surfaces of the separation membranes was adjusted to 2 mm (2,000 μm) and that the dot size and the longitudinal and lateral intervals of the ethylene vinyl acetate copolymer resin coating were changed so that the surface area proportion of the internal resin members would be 67%, and its evaluation showed that the internal resin members had a roughly elliptic shape with a length of 11.7 mm and a breadth of 6.0 mm and that they were arranged in a dotted pattern with longitudinal and lateral intervals of 0.7 mm. Note that the internal resin members had roughly rectangular cross sections. The separation membrane had a permeability of $24.0 \times 10^{-9}$ m$^3$/m$^2$/s/Pa, which is lower than in Example 3. Measurements of the surface area proportion of resin members, gap between filtrate-side surfaces, and water permeability are listed in Table 1 (FIG. 12).

Example 9

A separation membrane element was prepared by the same procedure as in Example 3 except that the resin members located inside the filtrate-side surfaces of the separation membranes were disposed in a striped pattern and that the internal resin members had a surface area proportion of 31%, and its evaluation showed that the internal resin members had a linear shape with a length of 99.7 mm and a breadth of 1.8 mm and that they were arranged with lateral intervals of 5.0 mm. Note that the internal resin members had roughly rectangular cross sections. The separation membrane had a water permeability of $25.3 \times 10^{-9}$ m$^3$/m$^2$/s/Pa, which is nearly at the same level as in Example 3. Measurements of the surface area proportion of resin members, gap between filtrate-side surfaces, and water permeability are listed in Table 2 (FIG. 13).

Example 10

A separation membrane element was prepared by the same procedure as in Example 3 except that the resin members located inside the filtrate-side surfaces of the separation membranes were disposed in a striped pattern and that the internal resin members had a surface area proportion of 57%, and its evaluation showed that the internal resin members had a linear shape with a length of 10.1 mm and a breadth of 3.7 mm and that they were arranged with a lateral interval of 3.5 mm. Note that the internal resin members had roughly rectangular cross sections. The separation membrane had a permeability of $24.1 \times 10^{-9}$ m$^3$/m$^2$/s/Pa, which is lower than in Example 9. Measurements of the surface area proportion of resin members, gap between filtrate-side surfaces, and water permeability are listed in Table 2 (FIG. 13).

Example 11

A separation membrane element was prepared by the same procedure as in Example 3 except that the resin members located inside the filtrate-side surfaces of the separation membranes were arranged in a checkered-steel-plate-like checkered pattern and that the internal resin members had a surface area proportion of 10%, and its evaluation showed that the internal resin members had a roughly rectangular shape with a length of 17.0 mm and a breadth of 1.7 mm and that they were arranged in a checkered-steel-plate-like checkered pattern with intervals of 6.7 mm. Note that the internal resin members had roughly rectangular cross sections. The separation membrane had a water permeability of $25.0 \times 10^{-9}$ m$^3$/m$^2$/s/Pa, which is nearly at the same level as in Example 3. Measurements of the surface area proportion of resin members, gap between filtrate-side surfaces, and water permeability are listed in Table 2 (FIG. 13).

Example 12

A separation membrane element was prepared by the same procedure as in Example 11 except that the resin members located inside the filtrate-side surfaces of the separation membranes were arranged in a checkered-steel-plate-like checkered pattern and that the internal resin members had a surface area proportion of 34%, and its evaluation showed that the internal resin members had a roughly rectangular shape with a length of 6.8 mm and a breadth of 3.2 mm and that they were arranged in a checkered-steel-plate-like checkered pattern with intervals of 1.6 mm. Note that the internal resin members had roughly rectangular cross sections. The separation membrane had a water permeability of $24.8 \times 10^{-9}$ m$^3$/m$^2$/s/Pa, which is nearly at the same level as in Example 11. Measurements of the surface area proportion of resin members, gap between filtrate-side surfaces, and water permeability are listed in Table 2 (FIG. 13).

Example 13

A separation membrane element was prepared by the same procedure as in Example 11 except that the resin members located inside the filtrate-side surfaces of the separation membranes were arranged in a checkered-steel-plate-like checkered pattern and that the internal resin members had a surface area proportion of 59%, and its evaluation showed that the internal resin members had a roughly rectangular shape with a length of 14.3 mm and a breadth of 3.2 mm and that they were arranged in a checkered-steel-plate-like checkered pattern with intervals of 1.3 mm. Note that the internal resin members had roughly rectangular cross sections. The separation membrane had a permeability of $24.2 \times 10^{-9}$ m$^3$/m$^2$/s/Pa, which is slightly lower than in Example 11. Measurements of the surface area proportion of resin members, gap between filtrate-side surfaces, and water permeability are listed in Table 2 (FIG. 13).

Example 14

A separation membrane element was prepared by the same procedure as in Example 3 except that the resin members located inside the filtrate-side surfaces of the separation membranes were arranged in a grid pattern and that the internal resin members had a surface area proportion of 34%, and its evaluation showed that the internal resin members had a length of 13.8 mm and a breadth of 7.5 mm and that they were arranged in a roughly #-like grid pattern with intervals of 3.4 mm. Note that the internal resin members had roughly rectangular cross sections. The separation membrane had a permeability of $24.5 \times 10^{-9}$ m$^3$/m$^2$/s/Pa, which is lower than in Example 1. Measurements of the surface area proportion of resin members, gap between filtrate-side surfaces, and water permeability are listed in Table 3 (FIG. 14).

Comparative Example 1

A separation membrane element was prepared by the same procedure as in Example 1 except that the resin was applied only to the circumference of the filtrate-side surfaces of the separation membranes, and its evaluation was carried out. The gap between the filtrate-side surfaces of the separation membranes was 0.4 mm or less (400 μm or less), and the separation membrane had a permeability of $6.3 \times 10^{-9}$ m$^3$/m$^2$/s/Pa, which is about ¼ of that in Example 1. Measurements of the presence/absence of resin members, gap between filtrate-side surfaces, and water permeability are listed in Table 3 (FIG. 14).

Comparative Example 2

A separation membrane element was prepared by the same procedure as in Example 1 except that the resin was applied only to the circumference of the filtrate-side surfaces of the separation membranes and that a net (thickness 700 μm, mesh size 5 mm×5 mm, fiber diameter 780 μm, projected area proportion 30%) for maintaining a flow channel is embedded, and its evaluation was carried out. The separation membrane element had a water permeability of $16.2 \times 10^{-9}$ m$^3$/m$^2$/s/Pa, which is about ⅗ of that in Example 1. Measurements of the presence/absence of resin members, gap between filtrate-side surfaces, and water permeability are listed in Table 3 (FIG. 14).

Example 15

A separation membrane element was prepared by the same procedure as in Example 1 except that the coating height of the ethylene vinyl acetate copolymer resin and the thickness of the aluminum plate spacer were adjusted so that the gap between the filtrate-side surfaces of the separation membranes would be 0.03 mm (30 μm), and its evaluation showed that the separation membrane had a water permeability of $18.6 \times 10^{-9}$ m$^3$/m$^2$/s/Pa, which is about ¾ of that in Example 1. Measurements of the surface area proportion of resin members, gap between filtrate-side surfaces, and water permeability are listed in Table 3 (FIG. 14).

Example 16

A separation membrane element was prepared by the same procedure as in Example 3 except that the dot size and the longitudinal and lateral intervals of the ethylene vinyl acetate copolymer resin coating were changed so that the surface area proportion of the internal resin members would be 77%, and its evaluation showed that the separation membrane had a water permeability of $17.6 \times 10^{-9}$ m$^3$/m$^2$/s/Pa, which is about 5/7 of that in Example 1. Measurements of the surface area proportion of resin members, gap between filtrate-side surfaces, and water permeability are listed in Table 3 (FIG. 14).

Example 17

A separation membrane element was prepared by the same procedure as in Example 1 except that ethylene vinyl acetate copolymer resin (trade name 705AT, manufactured by Tex Year Industries Inc., softening point 82° C.) was used as the resin to be applied to the resin members located inside the filtrate-side surfaces of the separation membranes and to the peripheral sealing member and that the temperature of the resin to be applied and that of the oven were 100° C. and 70° C., respectively. The resulting separation membrane element had a water permeability of $24.7 \times 10^{-9}$ m$^3$/m$^2$/s/Pa, which is nearly at the same level as in Example 1.

Example 18

A separation membrane element was prepared by the same procedure as in Example 1 except that modified olefin based resin (trade name EV165, manufactured by Toagosei Co., Ltd., softening point 105° C.) was used as the resin to be applied to the resin members located inside the filtrate-side surfaces of the separation membranes and to the peripheral sealing member and that the temperature of the resin to be applied and that of the oven were 120° C. and 95° C., respectively. The resulting separation membrane element had a water permeability of $24.8 \times 10^{-9}$ m$^3$/m$^2$/s/Pa, which is at the same level as in Example 1.

Example 19

A separation membrane element was prepared by the same procedure as in Example 1 except that thermoplastic rubber (trade name SGH2005G, manufactured by Asahi Chemical Synthetic Co., Ltd., softening point 185° C.) was used as the resin to be applied to the resin members located inside the filtrate-side surfaces of the separation membranes and to the peripheral sealing member and that the temperature of the resin to be applied and that of the oven were 200° C. and 170° C., respectively. The resulting separation membrane had a water permeability of $24.8 \times 10^{-9}$ m$^3$/m$^2$/s/Pa, which is at the same level as in Example 1.

Example 20 and Comparative Example 5

The separation membrane elements prepared in Example 1, Example 2, Example 9, Example 12, and Comparative example 2 were applied to MBR, and their durability was evaluated.

Each separation membrane element had the same structure as those prepared for permeability measurement in Example 1 and Comparative example 2 and had a roughly rectangular shape with a size of 50 cm×50 cm. The test method used was as follows: 10 separation membrane elements were stacked in parallel to each other to form a separation membrane module, which was then immersed in an activated sludge tank and operated for about 3 months under the conditions of a water permeability in the activated sludge of 0.3 m/day and an aeration load of 15 L/min/element applied from the bottom. Note that the aeration load has direct influence on the energy cost for operation, and commonly, it is only required to be at the minimal level, and generally it should be 20 L/min/element or less.

Results showed that each separation membrane module that include separation membrane elements as prepared in Example 1, Example 2, Example 9, or Example 12 was found to be free of element damage after the about 3 month test, proving a practical flexibility and rigidity. Compared to these, the separation membrane module that includes separation membrane elements as prepared in Comparative example 2 was found to suffer from element damage, which caused leakage of suspended matter about one month after the start of operation, suggesting an insufficient flexibility and rigidity.

Reference Example 1

Separation membrane elements as prepared in Example 3 and Example 12 were applied to MBR, and their durability against aeration was compared.

Each separation membrane element had the same structure as those prepared for permeability measurement in Example 3 and Example 12 and had a roughly square shape with a size of 50 cm×50 cm. The test method used was as follows: 10 separation membrane elements were stacked in parallel to each other to form a separation membrane module, which was then immersed in an activated sludge tank and operated for about 3 months under the conditions of a water permeability in the activated sludge of 0.3 m/day and an aeration load of 40 L/min/element applied from the bottom. Note that the aeration load of 40 L/min/element is about twice that taking place under ordinary operation conditions, and such a large aeration load is not applied commonly.

Results showed that slight wrinkles were seen along the dotted bonding lines on the surfaces of the separation membranes in the separation membrane element prepared in Example 3, whereas no wrinkles were found on the surfaces of the separation membranes in the separation membrane element prepared in Example 12, confirming that the arrangement of resin members in a checkered-steel-plate-like checkered pattern improves the rigidity and durability of a separation membrane element.

Example 21

A separation membrane element was prepared by the same procedure as in Example 1 except that the coating height of the ethylene vinyl acetate copolymer resin and the thickness of the aluminum plate spacer were adjusted so that the gap between the filtrate-side surfaces of the separation membranes would be 5.5 mm (5,500 μm), and its evaluation showed that the separation membranes had a water permeability of $25.1 \times 10^{-9}$ m³/m²/s/Pa, which is nearly at the same level as in Example 1.

The separation membrane element prepared above and the separation membrane element prepared in Example 4 were processed by the same procedure as in Example 20 to produce separation membrane modules, and their durability was evaluated. Only the separation membrane element prepared above was found to suffer from wrinkles on the surface of the separation membranes. This separation membrane element suffered from no damage or leakage of suspended matter, but the wrinkles may cause damage in the course of long term operation.

Example 22 and Comparative Example 7

A separation membrane element was prepared by the same procedure as in Example 1 except that olefin based resin (trade name AR1234, manufactured by Asahi Chemical Synthetic Co., Ltd., softening point 73° C.) was used as the resin to be applied to the resin members located inside the filtrate-side surfaces of the separation membranes and to the peripheral sealing member and that the temperature of the resin to be applied and that of the oven were 90° C. and 60° C., respectively. The resulting separation membrane had a water permeability of 24.9×10−9 m3/m2/s/Pa, which is nearly at the same level as in Example 1.

The separation membrane element prepared above and the separation membrane element prepared in Example 15 were processed by the same procedure as in Example 20 to produce separation membrane modules, and their durability was evaluated by the procedure described in Reference example 1, with results showing that the peeling of an internal resin portion from a filtrate-side surface was found on in the element prepared above. Leakage of suspended matter from this separation membrane element was not found, but there is a risk of damage to the separation membranes in the course of long term operation.

Example 23

Comparison was made between a conventional separation membrane element that had a support plate of ABS resin (conventional product) and a separation membrane element configured according to the present invention (the present invention) and between two membrane modules that are produced by arranging 100 of either of these separation membrane elements. Results are listed in Table 4. All separation membranes used were of the same type and had the same plane size (0.5 m×1.4 m).

The separation membrane element configured according to the present invention had a structure as schematically illustrated in FIG. 7, in which each resin member had a cylindrical shape with a diameter of about 3.0 mm and a height of about 2.5 mm. The periphery of the separation membranes was sealed with a sealing member with a width of about 20 mm, and a water collecting member with a width of about 35 mm was provided at a portion of the periphery in such a manner that such water collecting members of adjacent separation membrane elements will not be located at the same position. A water collecting port of polyethylene resin having a shape as illustrated in FIGS. 9 (a) and (b) was inserted into this water collecting member and sealed.

A separation membrane module was produced by making a through-hole (diameter about 20 mm) at the edge of separation membrane element as prepared above, arranging them such that adjacent water collecting ports would not be located at the same position, and passing a rod through the through-holes.

As clearly seen from the results in Table 4, the comparison between our separation membrane element and the conventional separation membrane element shows that the former was half in element thickness and ¼ in element weight. The total membrane module weight decreased to ¼ or less. The weight of a case required to hold a set of separation membrane elements can be reduced to about ⅕. This reduction in the weight of separation membrane elements serves to simplify the case structure. Finally, the membrane filling factor in our separation membrane module is 1.3 times that in the conventional separation membrane module. This is attributed not only to a reduction in the thickness of separation membrane elements, but also to an arrangement of water collecting ports that avoids the interference between them.

TABLE 4

| | Conventional product (with support plate (ABS)) | Present invention (without support plate) |
|---|---|---|
| Size of membrane element | 0.5 m × 1.4 m | 0.5 m × 1.4 m |
| Thickness of membrane element | 6.0 mm | 3.0 mm |
| weight of membrane element | 4.8 kg | 1.2 kg |
| Weight of membrane module (100 membranes) | 630 kg (including case of 150 kg) | 150 kg (including case of 30 kg) |
| Comparison of membrane filling factor (index) | 100 | 130 |

In regard to the durability test for separation membrane modules, results of an actual few months operation of a prototype module for MBR including separation membrane elements (support plate free elements) show that the support plate free elements can successfully evade the energy of aeration and that the separation membrane elements remain free of damage.

The invention claimed is:

1. A separation membrane element comprising a pair of separation membranes containing two separation membranes arranged so that the filtrate-side surfaces thereof are disposed in mutually opposed relation, a peripheral sealing member disposed between and sealed to peripheral edges of the pair of the separation membranes, and a multiplicity of individual resin members extending between the separation membranes and bonded to both of the mutually opposed filtrate-side surfaces, wherein the resin members 1) are positioned in and maintain a predetermined gap between the separation membranes such that the gap functions as a flow channel between the separation membranes, and 2) cause discontinuous shadows when projected onto the separation membrane.

2. The separation membrane element as described in claim 1, wherein a surface area of the resin members accounts for 1% or more and 70% or less of a surface area of the separation membranes inside the peripheral edges.

3. The separation membrane element as described in claim 2, wherein the separation membranes constituting the pair of separation membranes are disposed with a gap of 50 µm or more and 5,000 µm or less maintained therebetween.

4. The separation membrane element as described in claim 2, wherein the resin members are formed of thermoplastic polymer having a softening point of 80 to 200° C.

5. The separation membrane element as described in claim 2, wherein the resin members are disposed in a dotted, linear, or grid-like arrangement.

6. The separation membrane element as described in claim 2, wherein the resin members are disposed in a linear arrangement, the linearly arranged portions forming a checkered-steel-plate-like checkered pattern.

7. The separation membrane element as described in claim 1, wherein the separation membranes constituting the pair of separation membranes are disposed with a gap of 50 µm or more and 5,000 µm or less maintained therebetween.

8. The separation membrane element as described in claim 7, wherein the resin members are formed of thermoplastic polymer having a softening point of 80 to 200° C.

9. The separation membrane element as described in claim 7, wherein the resin members are disposed in a dotted, linear, or grid-like arrangement.

10. The separation membrane element as described in claim 7, wherein the resin members are disposed in a linear arrangement, the linearly arranged portions forming a checkered-steel-plate-like checkered pattern.

11. The separation membrane element as described in claim 1, wherein the resin members are formed of thermoplastic polymer having a softening point of 80 to 200° C.

12. The separation membrane element as described in claim 11, wherein the resin members are disposed in a dotted, linear, or grid-like arrangement.

13. The separation membrane element as described in claim 11, wherein the resin members are disposed in a linear arrangement, the linearly arranged portions forming a checkered-steel-plate-like checkered pattern.

14. The separation membrane element as described in claim 1, wherein the resin members are disposed in a dotted, linear, or grid-like arrangement.

15. The separation membrane element as described in claim 14, wherein the resin members are disposed in a linear arrangement, the linearly arranged portions forming a checkered-steel-plate-like checkered pattern.

16. The separation membrane element as described in claim 1, wherein the resin members are disposed in a linear arrangement, the linearly arranged portions forming a checkered-steel-plate-like checkered pattern.

17. The separation membrane element as described in claim 16, wherein checks in the checkered pattern of resin members are disposed in substantially parallel or substantially perpendicular directions to the peripheral edge of the pair of separation membranes.

18. The separation membrane element as described in claim 1, further comprising a water collecting member provided in a part of the peripheral sealing member so that a collected water flow channel disposed inside the peripheral sealing member runs out of the element through the water collecting member.

19. A separation membrane module comprising a plurality of separation membrane elements as described in claim 1 disposed in parallel to each other and arranged so that water collecting members of adjacent separation membrane elements are not located at the same position.

20. The separation membrane element as described in claim 1, wherein the separation membrane is impregnated with the resin component of the resin members.

* * * * *